United States Patent
Taguchi

(10) Patent No.: US 10,990,344 B2
(45) Date of Patent: Apr. 27, 2021

(54) INFORMATION PROCESSING APPARATUS, INFORMATION PROCESSING SYSTEM, AND INFORMATION PROCESSING METHOD

(71) Applicant: Daigo Taguchi, Kanagawa (JP)

(72) Inventor: Daigo Taguchi, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 16/791,176

(22) Filed: Feb. 14, 2020

(65) Prior Publication Data
US 2020/0264829 A1 Aug. 20, 2020

(30) Foreign Application Priority Data

Feb. 19, 2019 (JP) .............................. JP2019-027894
Jan. 15, 2020 (JP) .............................. JP2020-004404

(51) Int. Cl.
*G06F 3/14* (2006.01)
*G06F 40/166* (2020.01)

(52) U.S. Cl.
CPC .......... *G06F 3/1454* (2013.01); *G06F 40/166* (2020.01)

(58) Field of Classification Search
CPC ........ G06F 3/1454; G06F 3/06; G06F 3/0605; G06F 3/0622; G06F 3/0643; G06F 3/067; G06F 9/542; G06F 40/166
See application file for complete search history.

(56) References Cited

U.S. PATENT DOCUMENTS

2015/0085065 A1* 3/2015 Sun .................. H04W 4/80
348/14.08

FOREIGN PATENT DOCUMENTS

JP 2006-146415 6/2006

* cited by examiner

*Primary Examiner* — Robert J Michaud
(74) *Attorney, Agent, or Firm* — IPUSA, PLLC

(57) ABSTRACT

An information processing apparatus includes processing circuitry; and a memory storing computer-executable instructions that cause the processing circuitry to create data for displaying a web page in a web browser on a display device of at least one communication terminal among a plurality of communication terminals; and transmit the created data to the at least one communication terminal. The web page includes a first area for displaying a shared screen to be shared among the plurality of communication terminals; and a second area including at least an image of the shared screen displayed in response to an acquisition request, which is accepted at the at least one communication terminal, to acquire the image of the shared screen, and an editable area.

12 Claims, 33 Drawing Sheets

FIG.19

PERSONAL MEMO MANAGEMENT DB

| PERSONAL MEMO ID | USER ID | ROOM ID | SHEET ID | CAPTURED IMAGE | |
|---|---|---|---|---|---|
| PERSONAL MEMO A | User-a | room-a | FIRST SHEET: sheet-1 | capture-A1.jpg | ... |
| PERSONAL MEMO A | User-a | room-a | SECOND SHEET:sheet-2 | capture-A2.jpg | ... |
| PERSONAL MEMO A | User-a | room-a | THIRD SHEET: sheet-3 | capture-A3.jpg | ... |
| PERSONAL MEMO A | User-a | room-a | FOURTH SHEET: sheet-4 | capture-A4.jpg | ... |
| PERSONAL MEMO A | User-a | room-a | FIFTH SHEET: sheet-5 | capture-A5.jpg | ... |
| PERSONAL MEMO B | User-b | room-a | FIRST SHEET: sheet-1 | capture-B1.jpg | ... |
| PERSONAL MEMO B | User-b | room-a | SECOND SHEET: sheet-2 | capture-B2.jpg | ... |
| PERSONAL MEMO B | User-b | room-a | THIRD SHEET: sheet-3 | capture-B3.jpg | ... |
| PERSONAL MEMO C | User-c | room-a | FIRST SHEET: sheet-1 | capture-C1.jpg | ... |

FIG.20

SHARED MEMO MANAGEMENT DB

| SHARED MEMO ID | ROOM ID | BIBLIOGRAPHIC INFORMATION OF CONFERENCE | ... |
|---|---|---|---|
| SHARED MEMO a | room-a | DATE AND TIME: 2018/9/4<br>CONFERENCE NAME: Meeting<br>LOCATION: CONFERENCE ROOM A<br>SELF-EVALUATION: ★★★<br>... | ... |

FIG.21

PERSONAL MEMO DB

| PERSONAL MEMO ID | SHEET ID | CONTENT ID | CONTENT DATA | DISPLAY POSITION | ⋮ |
|---|---|---|---|---|---|
| PERSONAL MEMO A | sheet-1 | c101 | TYPE: TEXT MEMO<br>FONT TYPE: TIMES NEW ROMAN<br>SIZE: 20<br>TEXT CHARACTERS: ABCDE | (1,1) | |
| PERSONAL MEMO A | sheet-1 | c102 | TYPE: IMAGE<br>FILE NAME: xxx.jpg | (200,10) | ⋮ |
| PERSONAL MEMO A | sheet-1 | c103 | TYPE: VECTOR<br>NUMERICAL VALUE DATA: … | (1000,500) | |

FIG.22

SHARED MEMO DB

| SHARED MEMO ID | CONTENT ID | CONTENT DATA | DISPLAY POSITION |
|---|---|---|---|
| SHARED MEMO a | c201 | TYPE: TEXT MEMO<br>FONT TYPE: TIMES NEW ROMAN<br>SIZE: 20<br>TEXT CHARACTERS: R | (400,270) |
| SHARED MEMO a | c202 | TYPE: IMAGE<br>FILE NAME: yyy.jpg | (400,20) |
| SHARED MEMO a | c203 | TYPE: VECTOR<br>NUMERICAL VALUE DATA: ... | (120,600) |
| ... | ... | ... | ... |

FIG.23

INTEREST LEVEL MANAGEMENT DB

| PERSONAL MEMO ID | NUMBER OF TIMES OF REFERRING TO CAPTURE (AFTER CONFERENCE) | | QUANTITY OF WRITING | | | | DL BY PDF |
|---|---|---|---|---|---|---|---|
| | TOTAL NUMBER OF TIMES OF CAPTURING STREAMING REFERRING TO CAPTURE | NUMBER OF TIMES OF REFERRING TO EACH CAPTURE AND REFERENCE TIME | TOTAL NUMBER OF TEXT CHARACTERS IN EACH PERSONAL MEMO | NUMBER OF TEXT CHARACTERS OF EACH CAPTURE IN PERSONAL MEMO | NUMBER OF HANDWRITTEN OBJECTS (LINES, STAMPS, etc.) | NUMBER OF HANDWRITTEN OBJECTS IN EACH CAPTURE IN PERSONAL MEMO | NUMBER OF HANDWRITTEN CHARACTERS WITH RESPECT TO CAPTURE | |
| PERSONAL MEMO A | 5 | FIRST SHEET 4 2/8, 2/9 SECOND SHEET 1 2/9 ∶ | 200 | FIRST SHEET 50 SECOND SHEET 0 ∶ | 40 | FIRST SHEET 20 SECOND SHEET 0 ∶ | 10 | NOT PERFORMED |
| PERSONAL MEMO B | 6 | FIRST SHEET 2 SECOND SHEET 4 ∶ | 100 | FIRST SHEET 0 SECOND SHEET 30 ∶ | 20 | FIRST SHEET 5 SECOND SHEET 10 ∶ | 5 | NOT PERFORMED |
| PERSONAL MEMO C | 0 | 0 | 10 | FIRST SHEET 10 SECOND SHEET 0 ∶ | 0 | FIRST SHEET 0 SECOND SHEET 0 ∶ | 0 | PERFORMED AT TIME POINT OF 2:30 AFTER STARTING STREAMING |

FIG.29

| DATE AND TIME | CONFERENCE NAME | LOCATION | PERSONAL BOARD | SHARED BOARD | SELF-EVALUATION | BIBLIOGRAPHIC INFORMATION |
|---|---|---|---|---|---|---|
| 2018-10-05 20:30 | TEST | | ▪ | ▪ | ☆☆☆☆☆ | ▫ |
| 2018-10-05 20:30 | [PERSONAL] | | ▪ | ▪ | ☆☆☆☆☆ | ▫ |
| 2018-10-05 10:00 | DAILY MTG | room4 | ▪ | ▪ | ☆☆☆☆☆ | ▫ |
| 2018-09-05 04:00 | CONSULTATION | room2 | ▪ | ▪ | ★★★☆☆ | ▫ |
| 2018-09-04 09:53 | MEETING | CONFERENCE ROOM A | ▪ | ▪ | ★★☆☆☆ | ▫ |
| 2018-09-04 07:40 | BRIEFING SESSION | room3 | ▪ | ▪ | ★★☆☆☆ | ▫ |
| 2018-08-28 13:00 | CONSULTATION ABOUT TRAINING ORGANIZATION | room1 | ⋯ | ⋯ | | |

BIBLIOGRAPHIC INFORMATION

[HOST INFORMATION]
EVENT NAME: REGULAR
HOST DATE AND TIME: 2018/12/1 10:00-11:00
HOST LOCATION: 1F CONFERENCE ROOM A
ORGANIZER: USER A
PARTICIPANTS: USER B, USER C

[CAPTURE INFORMATION]

INPUT PARTICIPANT NAME | REFINE

| THUMBNAIL | 1 | 2 | 3 | | | |
|---|---|---|---|---|---|---|
| NUMBER OF TIMES OF CAPTURING | ONE TIME | TWO TIMES | ONE TIME | | | |

FIG.31

| CAPTURED IMAGE | NUMBER OF TIMES OF CAPTURING |
|---|---|
| 20180927134809448.jpg<br>REVIEW FIRST HALF | 15 |
| 20180927135236407.jpg<br>BUSINESS RESULTS  FISCAL YEAR 17 | 8 |
| 20180927151242014.jpg<br>·DIFFERENCE IN FLOW OF CUSTOM ORDERING VIEWED FROM··· | 6 |
| 20180927133557918.jpg<br>TOP PAGE OF ENTIRE CONFERENCE | 5 |
| 20180927134813026.jpg<br>··ORGANIZATION FUNCTION DIAGRAM (CENTER DEPARTMENT... | 4 |

FIG.32

INFORMATION PROCESSING APPARATUS, INFORMATION PROCESSING SYSTEM, AND INFORMATION PROCESSING METHOD

CROSS-REFERENCE TO RELATED APPLICATION

The present application is based on and claims priority under 35 U.S.C. § 119 to Japanese Patent Application No. 2019-027894, filed on Feb. 19, 2019, and Japanese Patent Application No. 2020-004404, filed on Jan. 15, 2020, the contents of which are incorporated herein by reference in their entirety.

BACKGROUND OF THE INVENTION

1. Field of the Invention

The present invention relates to an information processing apparatus, an information processing system, and an information processing method.

2. Description of the Related Art

For example, there has been a conference support system that has various functions such as a video/audio recording and reproducing function, a board writing function, and a personal memo function. The conference support system integrates respective known systems that support the conference, and manages various contents (data) created by the known systems in association with respective conferences, and the managed contents can be referred to and utilized in association with each other (see, for example, Patent Document 1).

Patent Document 1: Japanese Unexamined Patent Application Publication No. 2006-146415

SUMMARY OF THE INVENTION

According to one aspect of the present invention, there is provided an information processing apparatus including processing circuitry; and a memory storing computer-executable instructions that cause the processing circuitry to create data for displaying a web page in a web browser on a display device of at least one communication terminal among a plurality of communication terminals; and transmit the created data to the at least one communication terminal, wherein the web page includes a first area for displaying a shared screen to be shared among the plurality of communication terminals; and a second area including at least an image of the shared screen displayed in response to an acquisition request, which is accepted at the at least one communication terminal, to acquire the image of the shared screen, and an editable area.

BRIEF DESCRIPTION OF THE DRAWINGS

FIG. 19 is a configuration diagram illustrating an example of a personal memo management DB according to an embodiment of the present invention;

FIG. 20 is a configuration diagram illustrating an example of a shared memo management DB according to an embodiment of the present invention;

FIG. 21 is a configuration diagram illustrating an example of a personal memo DB according to an embodiment of the present invention;

FIG. 22 is a configuration diagram illustrating an example of a shared memo DB according to an embodiment of the present invention;

FIG. 23 is a configuration diagram illustrating an example of an interest level management DB according to an embodiment of the present invention;

FIG. 29 is a diagram illustrating an example of the display of the personal portal screen according to an embodiment of the present invention;

FIG. 30 is a diagram illustrating an example of the bibliographic information screen according to an embodiment of the present invention;

FIG. 31 is a diagram illustrating an example of capture information of a bibliographic information screen according to an embodiment of the present invention;

FIG. 32 is a diagram illustrating an example of capture information of a bibliographic information screen according to an embodiment of the present invention.

DETAILED DESCRIPTION OF THE PREFERRED EMBODIMENTS

In the conference support system of Patent Document 1, various contents created by each known system are managed in association with each conference so that the managed content can be referred to and utilized in association with the corresponding conference. However, it has been desired to further improve the user's usability when using the system during a conference or when referring to and utilizing information during a conference and after a conference has ended.

A problem to be addressed by an embodiment of the present invention is to provide an information processing apparatus capable of improving a user's usability in an information processing system by which contents can be shared among a plurality of users.

Hereinafter, an embodiment of the present invention will be described in detail with reference to the drawings. The present embodiment describes an example of, but not limited to, an information sharing system for use in a conference, in which a shared board and a personal board can be used. The present embodiment is not limited to conferences, and can be applied to a variety of information processing systems as long as the system is applied to an event that is held by a group of people participating in the event, such as seminars, lectures, or classes. Note that to participate in the event to be held, the participants may actually gather together at the same location, or the participants may be present at different locations. Further, the present embodiment describes an example of a remote conference in which users are connected remotely; however, all of the users may be in the same room, and the users do not have to be physically distant from each other.

First Embodiment

<Overview of Information Sharing System During a Conference>

Figure 1:
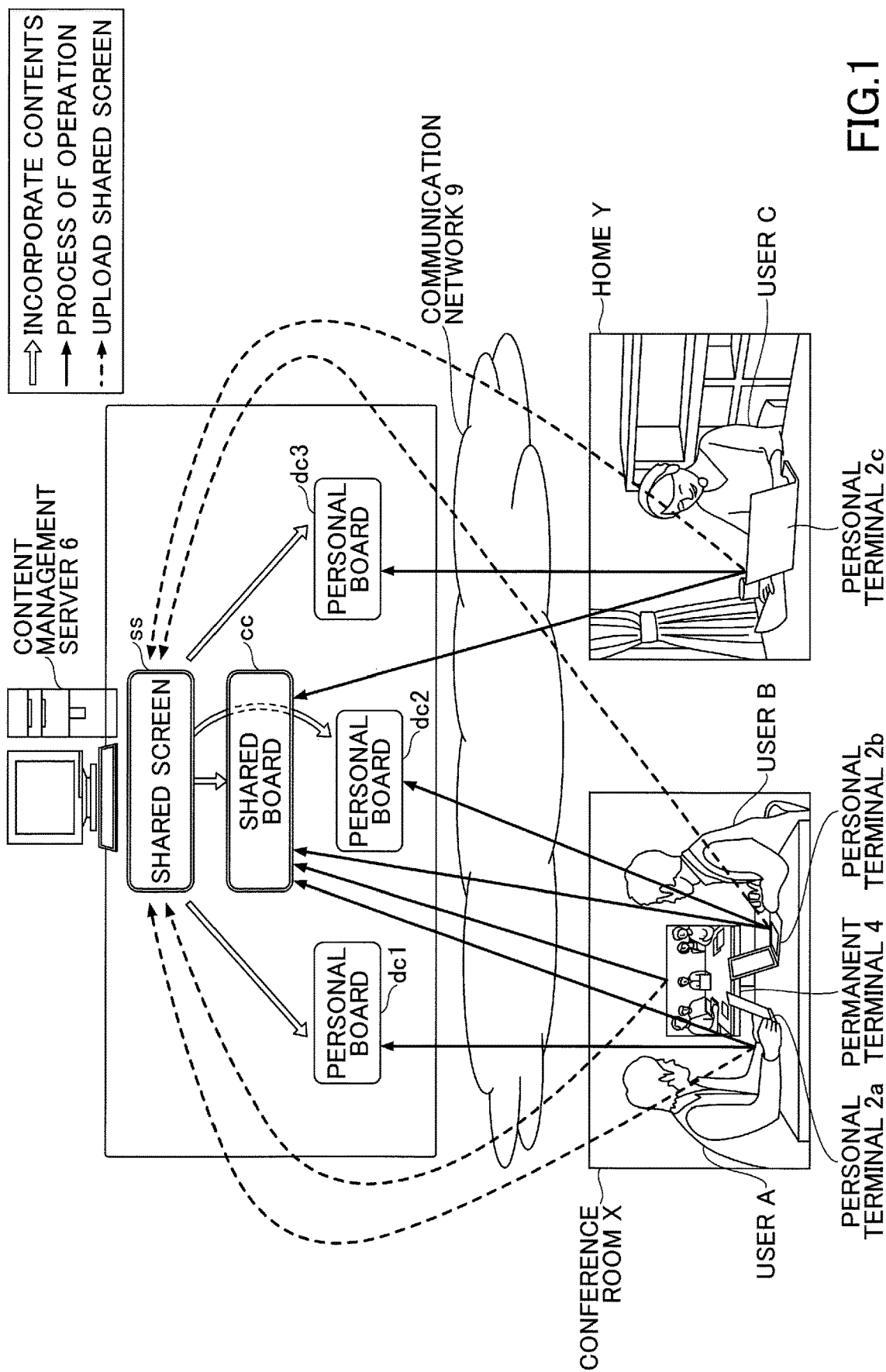
FIG. 1 is an overview diagram illustrating an information sharing system during a conference according to an embodiment of the present invention.

First, an overview of the information sharing system during a conference will be described with reference to FIG. 1. FIG. 1 is an overview diagram of the information sharing system during a conference. Here, it is illustrated that users A and B in a company's conference room X and user C in a home Y are holding a remote conference by using the information sharing system. In the conference room X, the user A brings in a personal terminal 2a, and the user B brings in a personal terminal 2b. Further, the conference room X is provided with a permanent terminal 4 that can be shared by a plurality of users. Note that the permanent terminal 4 is not essential. The information sharing system may have a configuration without the permanent terminal 4. At the home Y, the user C brings a personal terminal 2c. Hereinafter, the term "personal terminal 2" may be used to collectively refer to the personal terminals 2a, 2b, and 2c.

The personal terminal 2 is a computer that can be used and viewed (referred to) by a user personally (for exclusive-use). The permanent terminal 4 is a computer that can be used and viewed by a plurality of users jointly.

The personal terminal 2 may be, for example, a notebook PC (Personal Computer), a desktop PC, a mobile phone, a smartphone, a tablet terminal, a wearable PC, and the like. The personal terminal 2 and the permanent terminal 4 are examples of communication terminals (or information processing terminals).

The permanent terminal 4 may be, for example, a Projector (PJ), an Interactive White Board (IWB: white board having an electronic blackboard function enabling mutual communication), a digital signage, a display coupled to a stick PC, and the like. The permanent terminal 4 is an example of a communication terminal (or information processing terminal).

The personal terminal 2 and the permanent terminal 4 can communicate with a content management server 6 via a communication network 9 such as the Internet. The communication network 9 may be one or more Local Area Networks (LANs) inside a firewall or may include the Internet outside the firewall in addition to the LAN. The communication network 9 may also include a Virtual Private Network (VPN) and a Wide Area Ethernet (registered trademark). The communication network 9 may be either wired or wireless, or may be a combination of wired and wireless networks. Also, when connected by a mobile phone network such as 3G, Long Term Evolution (LTE), 4G, or the like, the LAN is not needed.

The content management server 6 is a computer that functions as a web server (or a HyperText Transport Protocol (HTTP) server) that stores and manages the content data to be transmitted to the personal terminal 2 and the permanent terminal 4. The content management server 6 includes a storage unit 6000, which will be described later.

In the storage unit 6000, a storage location (or storage area) for implementing a personal board dc1, dc2, and dc3, that can only be accessed from each corresponding personal terminal 2, is formed. Specifically, only each of the personal terminals 2a, 2b, and 2c can access one of the corresponding personal boards dc1, dc2, and dc3. Hereinafter, the term "personal board dc" may be used to collectively refer to the personal boards dc1, dc2, and dc3. The content management server 6 may support cloud computing. Cloud computing is a form of usage in which resources on a network are used without being aware of specific hardware resources.

Further, in the storage unit 6000 of the content management server 6, a storage location (or storage area) for implementing a shared board cc that can be accessed from the respective personal terminals 2, is formed. Further, in the storage unit 6000 of the content management server 6, a storage location (or storage area) for implementing a shared screen ss that can be accessed from the respective personal terminals 2, is formed.

The personal board dc and the shared board cc are a virtual space created in the storage location (or storage area) of the storage unit 6000 of the content management server 6. The personal board dc and the shared board cc can be accessed with a web application that includes a function for viewing and editing content, e.g., by canvas elements, JavaScript™, and the like. A web application operates by the coordination of programs in a scripting language (e.g., JavaScript (registered trademark)) running on a web browser application (hereinafter referred to as a web browser) with programs in a web server, and indicates software used in a web browser or mechanisms thereof. The personal board dc and the shared board cc have a finite or infinite area within the storage area of the storage unit 6000. For example, the personal board dc and the shared board cc may be finite or infinite in both longitudinal and lateral directions, or may be finite or infinite in one of longitudinal and lateral directions.

Further, the shared board cc is a virtual space created in the storage location (or storage area) of the storage unit 6000 of the content management server 6. Unlike the personal board dc and the shared board cc, the shared screen ss is provided with a function for simply holding content data to be transmitted (distributed) to the personal terminal 2 or the permanent terminal 4 and holding the previous contents until the next contents are acquired. The shared screen ss can be accessed by a web application that has a function of viewing content.

Further, the personal board dc is a personal electronic space exclusively used by each user participating in a remote conference. The personal terminal 2 of each user can only access the personal board dc for exclusive use by the corresponding personal terminal 2 and view and edit (input, delete, copy, etc.) the contents such as characters, images, etc. The shared board cc is a shared electronic space for the respective users participating in a remote conference. Every one of the personal terminals 2 of the respective users can access the shared board cc and view and edit contents such as characters and images.

Further, the shared screen ss is a shared electronic space for the respective users participating in a remote conference. Every one of the personal terminals 2 of the respective users can access the shared screen ss and view the shared screen ss. However, unlike the personal board dc and the shared board cc, the shared screen ss has a function of simply holding content data to be transmitted (distributed) to the personal terminal 2 or the permanent terminal 4 and holding the previous contents until the next contents are acquired.

For example, when content data is transmitted from the personal terminal 2a to the shared screen ss and subsequently, content data is transmitted from the personal terminal 2b to the shared screen ss, the content data held by the shared screen ss will be the content data transmitted from the personal terminal 2b that is the most recently received content data. For example, the shared screen ss displays a computer screen, such as an application screen, shared by the users.

The content management server 6 manages information such as contents that are expanded in the shared screen ss, the shared board cc, and the personal board dc in association with each other, for each virtual conference room (hereinafter, simply referred to as a room) that is an example of the virtual room. Accordingly, even when multiple rooms are managed by the content management server 6, communication of content data between different rooms will not be performed.

The personal terminal 2 can display the contents of the personal board dc, the shared board cc, and the shared screen ss in the room in which the user has participated, by the web application of the installed web browser, so that a conference that is similar to a real conference room can be held.

With such an information sharing system, a user can open a personal file by an application and share the personal file on the shared screen ss, share handwriting, object arrangements, and the like by the shared board cc, incorporate content shared on the shared screen ss into the personal board dc as personal material, or store handwriting, object arrangements, and the like, as a personal memo in the personal board dc.

Figure 33:
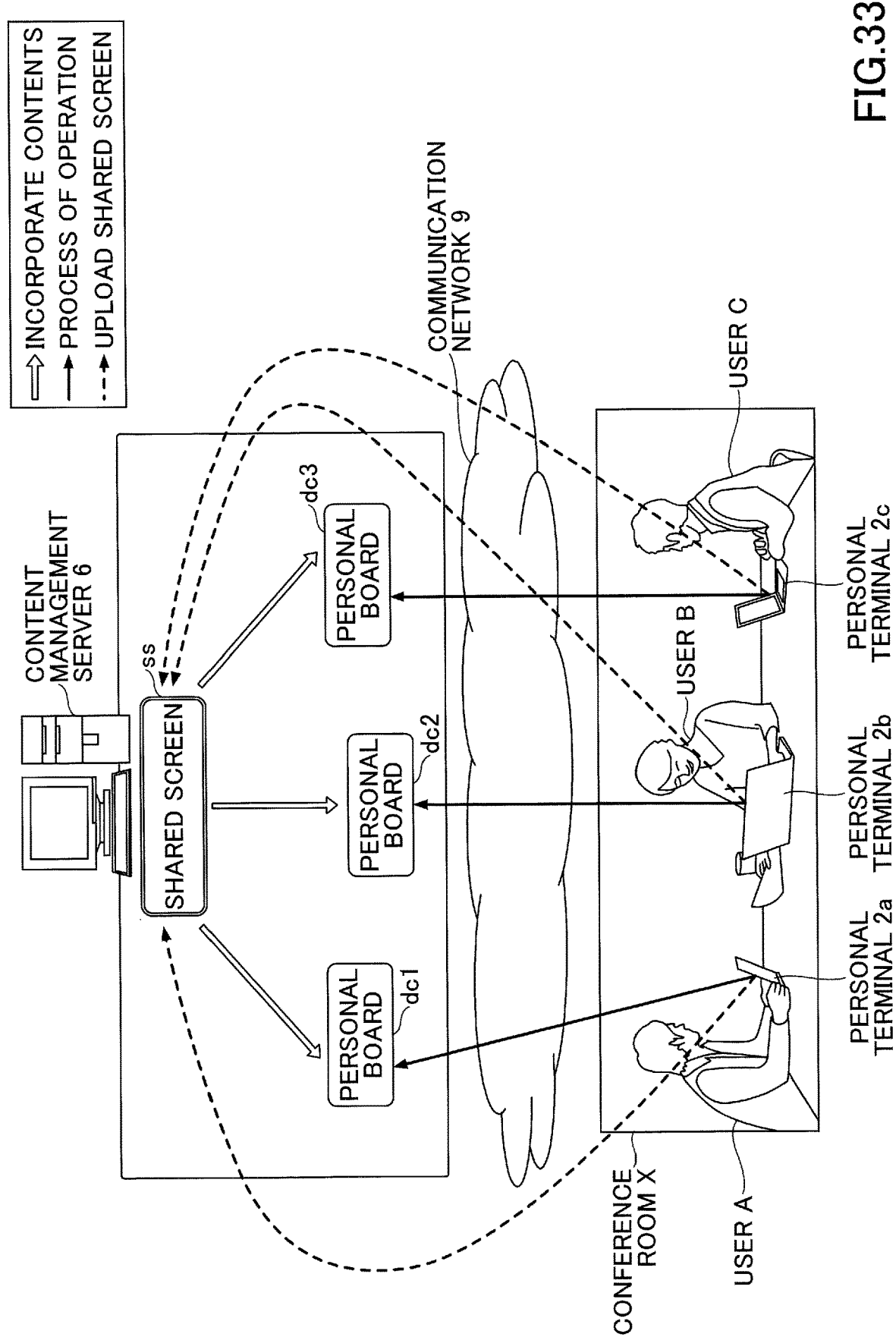
FIG. 33 is an overview diagram illustrating the information sharing system during a conference.

Note that the information sharing system of FIG. 1 is one example, and may not include any one or more of the shared screen ss, the shared board cc, and the personal board dc. For example, the information sharing system of FIG. 33 is an example formed of the shared screen ss and the personal board dc without the shared board cc. In the information sharing system of FIG. 33, each personal terminal 2 may display the contents of the personal board dc and the shared screen ss in the room in which the user participates, by the web application of the installed web browser.

<Overview of a Personal Portal in an Information Sharing System>

Figure 2:
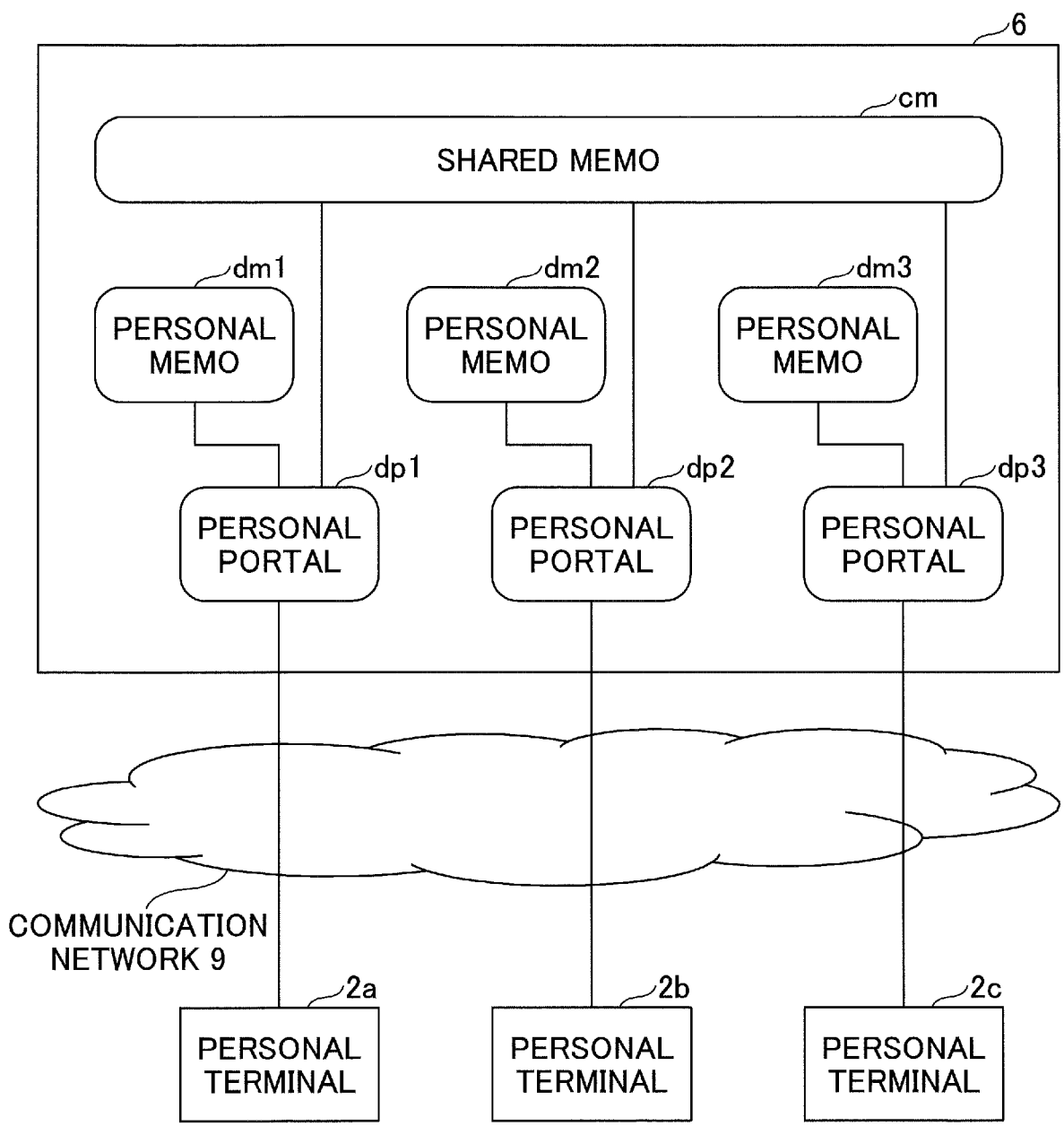
FIG. 2 is a diagram illustrating an example of an outline of a personal portal in an information sharing system according to an embodiment of the present invention.

Next, an outline of a personal portal will be described with reference to FIG. 2. FIG. 2 is a diagram illustrating an example of an overview of a personal portal in the information sharing system. The content management server 6 generates data of personal portal screens dp1, dp2, and dp3, each being exclusively used by one of the personal terminals 2, and displays the generated data on each of the corresponding personal terminals 2. Hereinafter, the term "personal portal screen dp" may be used to collectively refer to the personal portal screens dp1, dp2, and dp3.

The content management server 6 stores and manages a shared memo cm, which is a content edited during the conference in the shared board cc of FIG. 1, and personal memos dm1, dm2, and dm3, which are contents respectively edited by the personal boards dc. Hereinafter, the term "personal memo dm" may be used to collectively refer to the personal memos dm1, dm2, and dm3. Each user can access the personal portal screen dp exclusively used by the corresponding personal terminal 2 to display a list of conferences in which the user operating the personal terminal 2 has participated.

The user can display the shared memo cm, the personal memo dm, and bibliographic information of the conference of each conference, from the list of conferences displayed on the personal portal screen dp, as described below. Accordingly, the user can easily display the shared memo cm, the personal memo dm, and bibliographic information of the desired conference, when reviewing the contents of the conference and the like. Further, each user may access the personal portal screen dp exclusively used by each of the personal terminals 2 and perform a keyword (character) search with respect to the desired conference based on the list of conferences of the user operating the personal terminal 2, as described below. Note that the search targets of character search include bibliographic information of the conference, text data and handwritten characters included in the personal memo dm, evaluation of conferences by users, and the like. Note that the bibliographic information of the conference is included in the conference information.

<Hardware Configuration>
<<Computer>>

Figure 3:
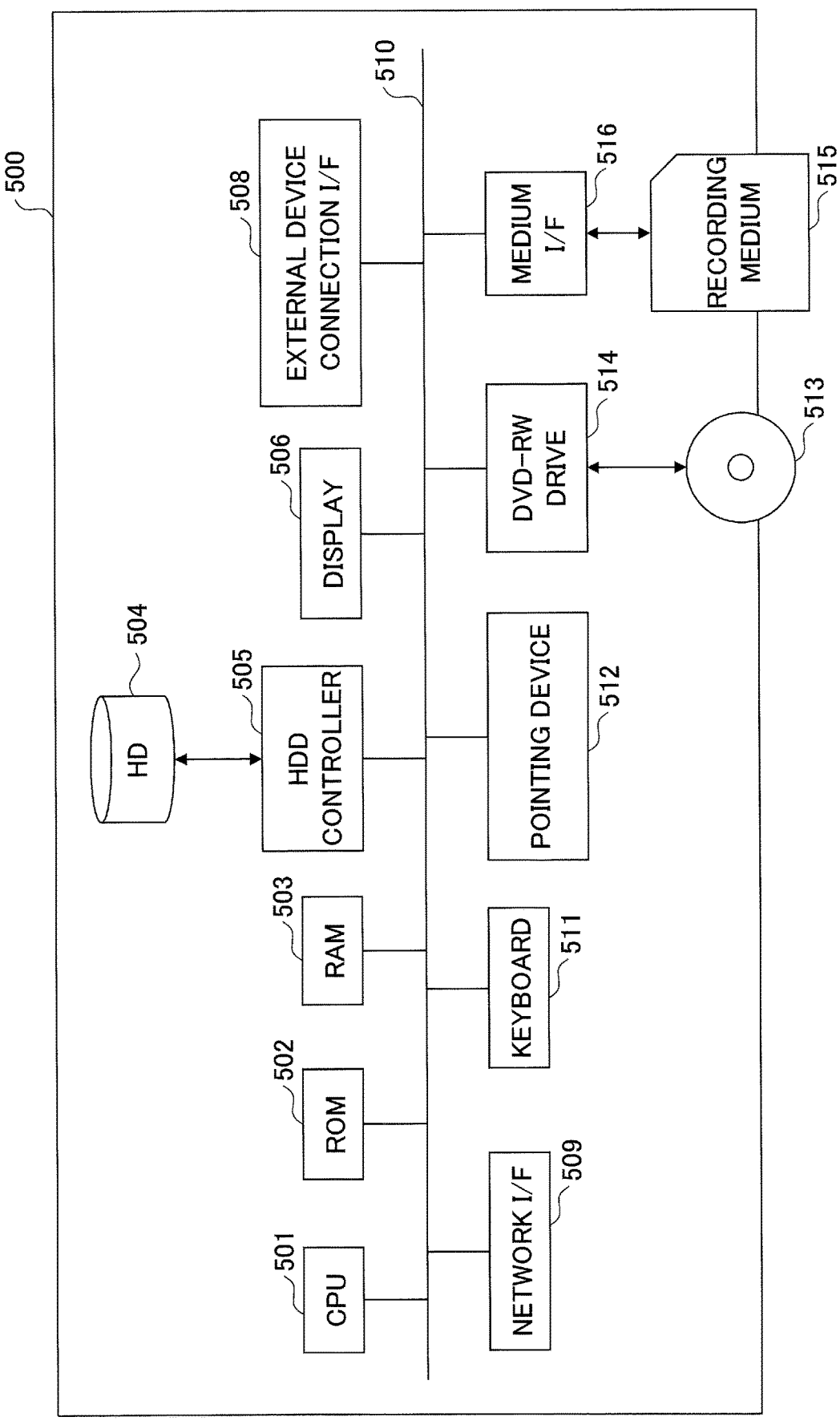
FIG. 3 is a hardware configuration diagram illustrating an example of a computer according to an embodiment of the present invention.

The content management server 6 is implemented, for example, by a computer 500 having a hardware configuration illustrated in FIG. 3. Further, when the personal terminal 2 is a PC which is an example of an information processing terminal, the personal terminal 2 is implemented, for example, by the computer 500 having the hardware configuration illustrated in FIG. 3.

FIG. 3 is an example of a hardware configuration diagram of the computer 500 according to the present embodiment. As illustrated in FIG. 3, computer 500 includes a Central Processing Unit (CPU) 501, a Read-Only Memory (ROM) 502, a Random Access Memory (RAM) 503, a Hard Disk (HD) 504, a HDD (Hard Disk Drive) controller 505, a display 506, an external device connection Interface (I/F) 508, a network I/F 509, a data bus 510, a keyboard 511, a pointing device 512, a Digital Versatile Disk Rewritable (DVD-RW) drive 514, and a medium I/F 516.

Among these, the CPU 501 controls the operations of the entire computer 500. The ROM 502 stores programs used to drive the CPU 501, such as an initial program loader (IPL). The RAM 503 is used as the work area of the CPU 501. The HD 504 stores various kinds of data such as programs. The HDD controller 505 controls the reading or writing of various kinds of data with respect to the HD 504 according to control by the CPU 501.

The display 506 displays various kinds of information such as a cursor, a menu, a window, characters, images, and the like. The external device connection I/F 508 is an interface for coupling various external devices. In this case, the external device may be, for example, a Universal Serial Bus (USB) memory or a printer. The network I/F 509 is an interface for performing data communication by using the communication network 9. The data bus 510 is an address bus, a data bus, and the like, for electrically coupling elements such as the CPU 501.

The keyboard 511 is a type of input means with a plurality of keys for inputting characters, numerical values, various instructions, and the like. The pointing device 512 is a type of input means for selecting and executing various instructions, selecting a processing target, moving a cursor, and the like. The DVD-RW drive 514 controls the reading or writing of various kinds of data with respect to a DVD-RW 513 that is an example of a removable recording medium. The removable recording medium is not limited to a DVD-RW, but may be a DVD-R, etc. The medium I/F 516 controls the reading or writing (storage) of data with respect to a recording medium 515, such as a flash memory.

<<Smartphone>>

Figure 4:
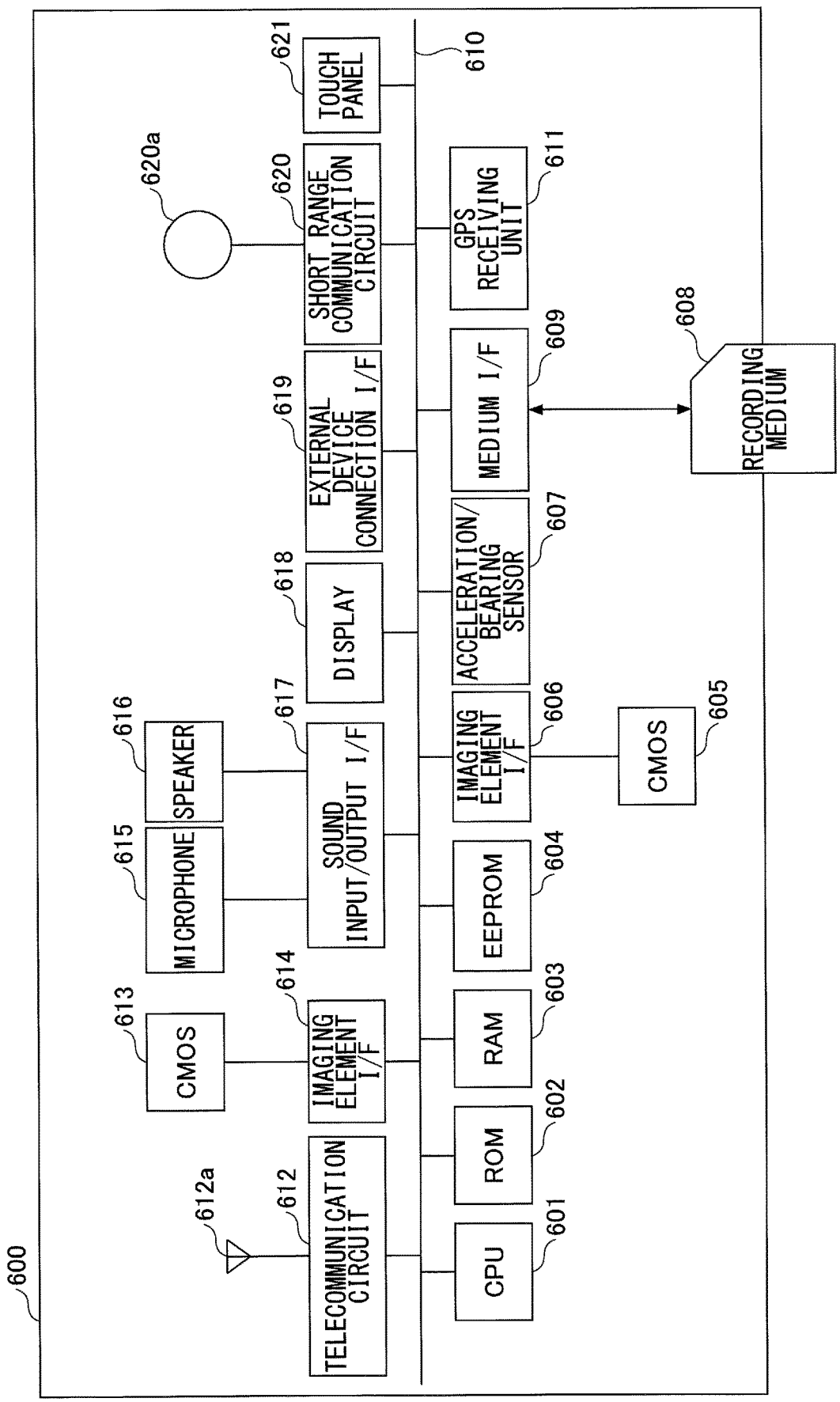
FIG. 4 is a hardware configuration diagram illustrating an example of a smartphone according to an embodiment of the present invention.

The personal terminal 2, which is an example of the information processing terminal, may be implemented, for example, by a smartphone 600 having the hardware configuration illustrated in FIG. 4.

FIG. 4 is an example of a hardware configuration diagram of the smartphone 600 according to the present embodiment. As illustrated in FIG. 4, the smartphone 600 includes a CPU 601, a ROM 602, a RAM 603, an Electrically Erasable Programmable Read-Only Memory (EEPROM) 604, a Complementary Metal Oxide Semiconductor (CMOS) sensor 605, an imaging element I/F 606, an acceleration/bearing sensor 607, a medium I/F 609, and a Global Positioning System (GPS) receiving unit 611.

Among these, the CPU 601 controls the operations of the entire smartphone 600. The ROM 602 stores programs used in the CPU 601 and for driving the CPU 601, such as the IPL. The RAM 603 is used as the work area of the CPU 601. The EEPROM 604 reads out or writes various kinds of data, such as programs for smartphones, according to the control of the CPU 601.

The CMOS sensor 605 is a type of built-in imaging means that captures an image of a subject (mainly a self-image) and obtains image data according to the control by the CPU 601. Note that the imaging means may not be the CMOS sensor 605 but may be a Charge Coupled Device (CCD) sensor and the like. The imaging element I/F 606 is a circuit that controls the driving of the CMOS sensor 605. The acceleration/bearing sensor 607 is a variety of sensors, such as an electromagnetic compass, which detects geomagnetic fields, a gyrocompass, an acceleration sensor, and the like.

The medium I/F 609 controls the reading or writing (storage) of data with respect to a recording medium 608, such as a flash memory. The GPS receiving unit 611 receives the GPS signal from the GPS satellite.

The smartphone 600 also includes a telecommunication circuit 612, a CMOS sensor 613, an imaging element I/F 614, a microphone 615, a speaker 616, a sound input/output I/F 617, a display 618, an external device connection I/F 619, a short range communication circuit 620, an antenna 620a of the short range communication circuit 620, and a touch panel 621.

Among these, the telecommunication circuit 612 is a circuit for communicating with other devices via the communication network 9. The CMOS sensor 613 is a type of built-in imaging means that captures an image of a subject according to the control by the CPU 601 and obtains image data. The imaging element I/F 614 is a circuit that controls the driving of the CMOS sensor 613. The microphone 615 is a built-in circuit that converts sound to an electrical signal. The speaker 616 is a built-in circuit that converts electrical signals to physical vibrations to produce sound, such as music and speech.

The sound input/output I/F 617 is a circuit that processes the input and output of sound signals between the microphone 615 and the speaker 616 according to the control by the CPU 601. The display 618 is a type of display means such as a liquid crystal or an organic Electro Luminescence (EL) for displaying an image of a subject, various icons, and the like.

The external device connection I/F 619 is an interface for coupling various external devices. The short range communication circuit 620 is a communication circuit such as Near Field Communication (NFC) or Bluetooth (registered trademark). The touch panel 621 is a type of input means by which a user presses the display 618 to operate the smartphone 600.

Further, the smartphone 600 includes a bus line 610. The bus line 610 is an address bus, a data bus, and the like, for electrically coupling elements such as the CPU 601 illustrated in FIG. 4.

<<Projector>>

Figure 5:
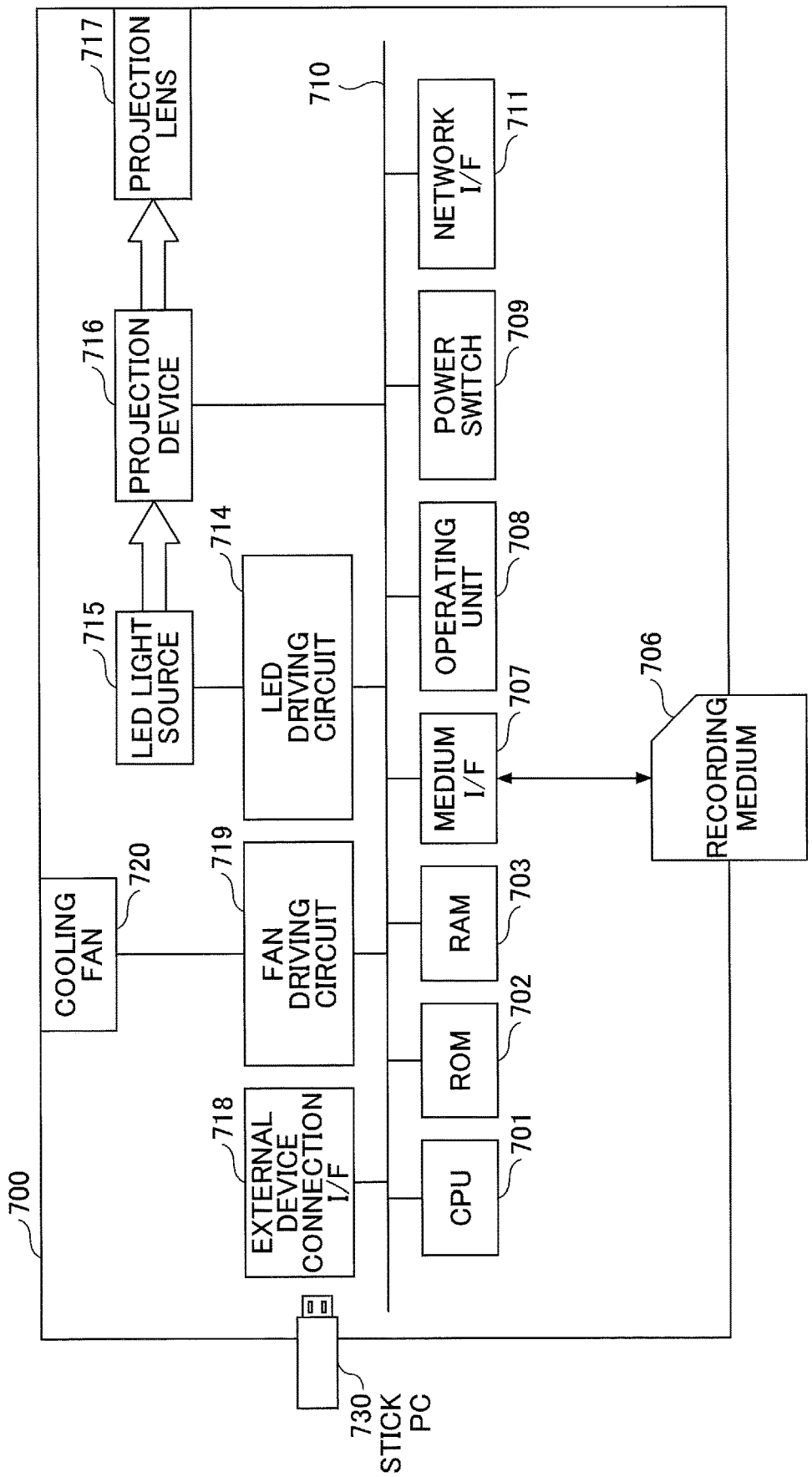
FIG. 5 is a hardware configuration diagram illustrating an example of a projector according to an embodiment of the present invention.

The projector 700, which is an example of the permanent terminal 4, may be implemented, for example, by the hardware configuration illustrated in FIG. 5.

FIG. 5 is an example of a hardware configuration diagram of a projector 700 according to the present embodiment. As illustrated in FIG. 5, the projector 700 includes a CPU 701, a ROM 702, a RAM 703, a medium I/F 707, an operating unit 708, a power switch 709, a bus line 710, a network I/F 711, a Light Emitting Diode (LED) driving circuit 714, an LED light source 715, a projection device 716, a projection lens 717, an external device connection I/F 718, a fan driving circuit 719, and a cooling fan 720.

Among these, the CPU 701 controls the operations of the entire projector 700. The ROM 702 stores the programs used to drive the CPU 701. The RAM 703 is used as the work area of the CPU 701. The medium I/F 707 controls the reading or writing (storage) of data with respect to a recording medium 706, such as a flash memory.

In the operating unit 708, a variety of keys, buttons, LEDs, and the like are disposed, and are used by a user to perform various operations other than turning ON/OFF the power of the projector 700. For example, the operating unit 708 accepts an instruction operation such as an adjustment operation of the size of the projected image, an adjustment operation of the color tone, a focus adjustment operation, a keystone adjustment operation, and the like, and outputs the accepted operation content to the CPU 701.

The power switch 709 is a switch for switching the power of the projector 700 on and off. The bus line 710 is an address bus, a data bus, and the like for electrically coupling the elements such as the CPU 701 illustrated in FIG. 5. The network I/F 711 is an interface for performing data communication by using the communication network 9 such as the Internet.

The LED driving circuit 714 controls the turning on and off of the LED light source 715 under the control of the CPU 701. When the LED light source 715 is turned on by the LED driving circuit 714, the LED light source 715 irradiates the projection device 716 with a projection light. The projection device 716 projects modulated light, which is obtained by modulating the projection light from the LED light source 715 by spatial light modulation, as an image to a projection surface of a screen, through the projection lens 717, based on image data provided via the external device connection I/F 718 and the like. Examples of the projection device 716 include a liquid crystal panel or a Digital Micromirror Device (DMD).

The LED driving circuit 714, the LED light source 715, the projection device 716, and the projection lens 717 collectively function as a projecting unit (projecting means) for projecting a projection image onto a projection surface based on image data.

The external device connection I/F 718 is directly coupled to a Personal Computer (PC) and acquires control signals and image data from the PC. The external device connection I/F 718 is an interface for coupling to various external devices (such as a stick PC 730). The fan driving circuit 719 is coupled to the CPU 701 and the cooling fan 720 to drive/stop the cooling fan 720 based on a control signal from the CPU 701. The cooling fan 720 rotates to discharge air from the interior of the projector 700 and cool the interior of the projector 700.

When the power is supplied, the CPU 701 starts up according to a control program stored in the ROM 702 in advance, provides a control signal to the LED driving circuit 714 to turn on the LED light source 715, and provides a control signal to the fan driving circuit 719 to rotate the cooling fan 720 at a predetermined rated speed. Further, when the power supply from the power supply circuit is started, the projector 700 becomes ready for image display by the projection device 716, and furthermore, power is supplied from the power supply circuit to various other elements. Further, when the power switch 709 of the projector 700 is turned OFF, a power OFF signal is transmitted from the power switch 709 to the CPU 701.

When the CPU 701 detects a power OFF signal, the CPU 701 provides a control signal to the LED driving circuit 714 to turn off the LED light source 715. Thereafter, when a predetermined time elapses, the CPU 701 provides a control signal to the fan driving circuit 719 to stop the cooling fan 720, and terminates the control process of the CPU 701, and finally transmits an instruction to the power supply circuit to terminate the supply of power.

<<Interactive White Board>>

Figure 6:
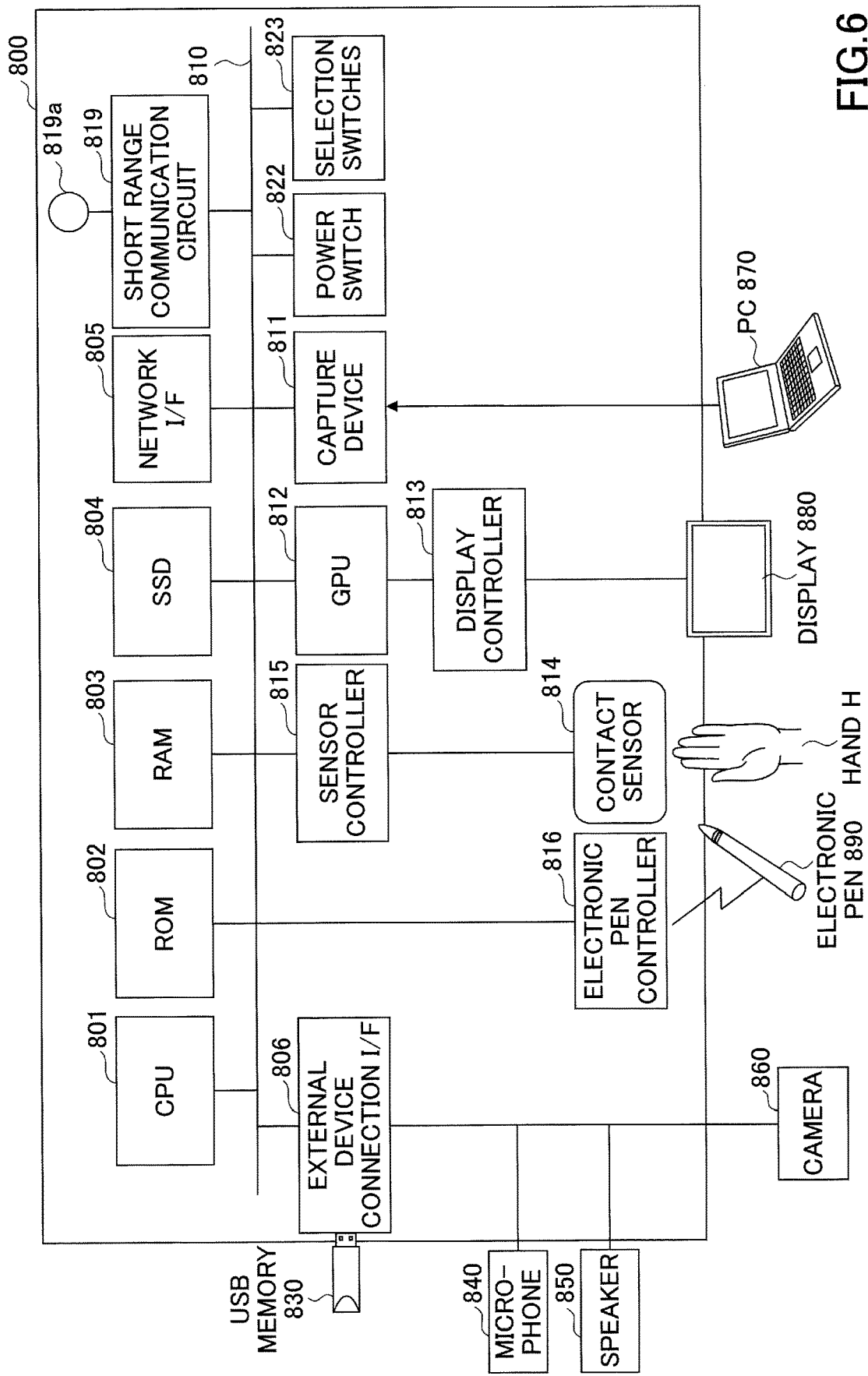
FIG. 6 is an example of a hardware configuration diagram illustrating an Interactive White Board (IWB) according to an embodiment of the present invention.

The IWB 800, which is an example of the permanent terminal 4, may be implemented, for example, by the hardware configuration illustrated in FIG. 6.

FIG. 6 is an example of a hardware configuration diagram of an IWB 800 according to the present embodiment. As illustrated in FIG. 6, the IWB 800 includes a CPU 801, a ROM 802, a RAM 803, a Solid State Drive (SSD) 804, a network I/F 805, and an external device connection I/F 806.

Among these, the CPU 801 controls operations of the entire IWB 800. The ROM 802 stores programs used in the CPU 801 and for driving the CPU 801 such as IPL. The RAM 803 is used as the work area of the CPU 801. The SSD 804 stores various kinds of data, such as programs for the IWB. The network I/F 805 controls communication with the communication network 9. The external device connection I/F 806 is an interface for coupling to various external devices. The external device in this case is, for example, a USB memory 830, an external device (a microphone 840, a speaker 850, and a camera 860).

Further, the IWB 800 includes a capture device 811, a Graphics Processing Unit (GPU) 812, a display controller 813, a contact sensor 814, a sensor controller 815, an electronic pen controller 816, a short range communication circuit 819, an antenna 819a of the short range communication circuit 819, a power switch 822, and selection switches 823.

Among these, the capture device 811 causes a display of an external PC 870 to display video information as a still image or a moving image. The GPU 812 is a semiconductor chip that is exclusively used for handling graphics. The display controller 813 controls and manages the screen display to output an output image from the GPU 812 to a display 880 and the like.

The contact sensor 814 detects that an electronic pen 890, the user's hand H, or the like has come into contact with the display 880. The sensor controller 815 controls the processing by the contact sensor 814. The contact sensor 814 performs input of coordinates and detection of coordinates by an infrared interruption method. The method for inputting coordinates and detecting coordinates is a method in which two light emitting and receiving devices, which are located at both ends at the upper side of the display 880, emit a plurality of infrared rays parallel to the display 880, and the infrared rays are reflected by a reflecting member provided around the display 880, and the light returning on the same optical path as that of the emitted light, is received by a light receiving element.

The contact sensor 814 outputs, to the sensor controller 815, the ID of the infrared rays emitted by the two light emitting and receiving devices and interrupted by an object, and the sensor controller 815 identifies the coordinate position that is the contact position of the object. The electronic pen controller 816 communicates with the electronic pen 890 to determine whether the pen tip or the pen end is touching the display 880. The short range communication circuit 819 is a communication circuit such as NFC, Bluetooth, and the like. The power switch 822 is a switch for switching the power of the IWB 800 on and off. The selection switches 823 are a group of switches for adjusting, for example, the light and darkness and the coloring of the display by the display 880.

Further, the IWB 800 includes a bus line 810. The bus line 810 is an address bus, a data bus, and the like for electrically coupling elements such as the CPU 801 illustrated in FIG. 6.

The contact sensor 814 is not limited to an infrared interruption method. Various detection means may be used, such as a touch panel of an electrostatic capacitance method in which a contact position is identified by sensing a change in capacitance, a touch panel of a resistive film method in which a contact position is identified by a voltage change of two opposing resistive films, and an electromagnetic induction type touch panel in which an electromagnetic induction caused by a contact object contacting a display portion is sensed and a contact position is identified. Further, the electronic pen controller 816 may be used to determine not only whether the tip or the end of the electronic pen 890 is touching the display 880, but also whether the portion of the electronic pen 890 held by the user or another portion of the electronic pen 890 is touching the display 880.

<Functional Configuration>

Figure 7:
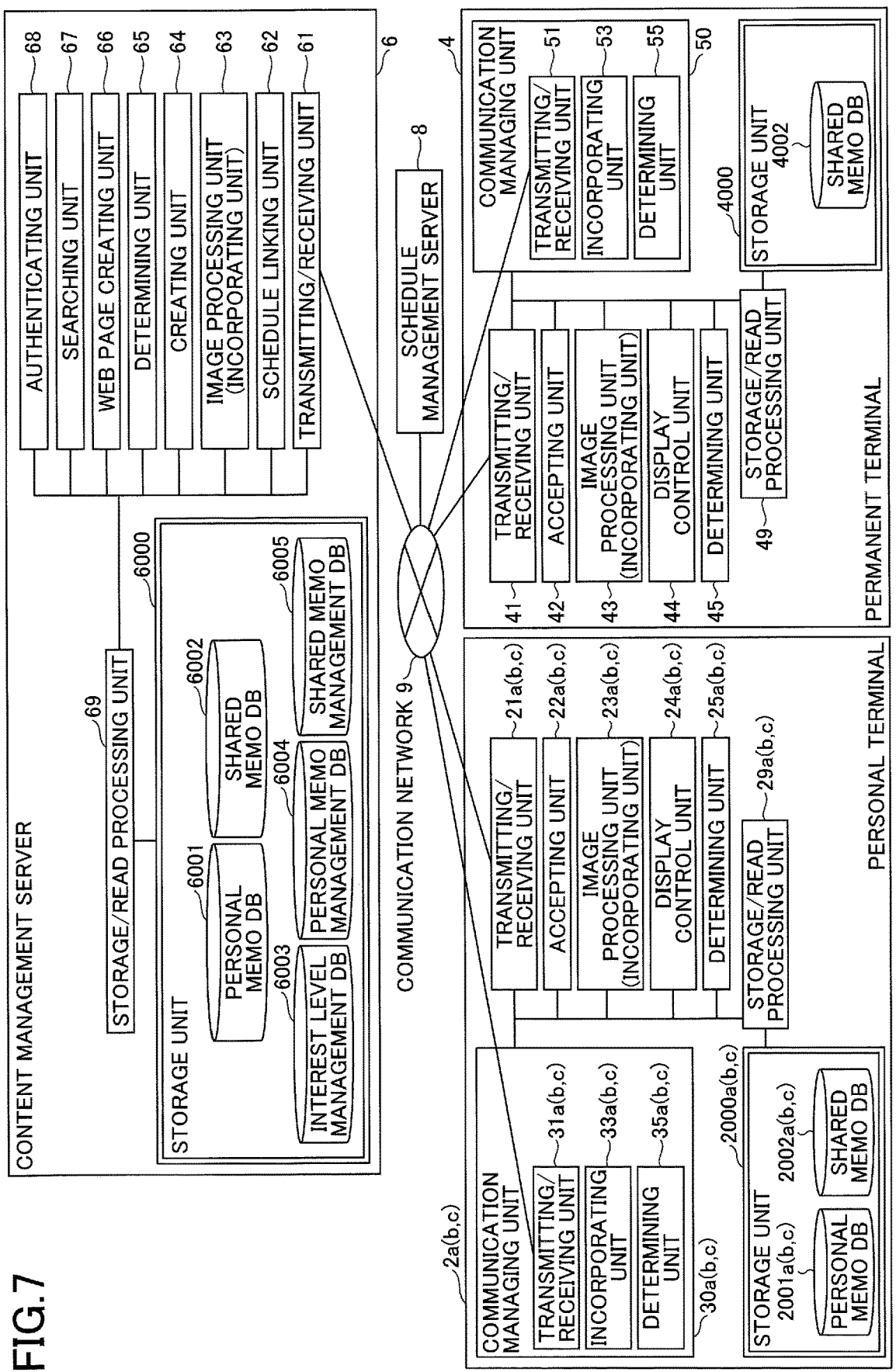
FIG. 7 is a functional block diagram illustrating each terminal and server constituting the information sharing system according to an embodiment of the present invention.

A functional configuration of each terminal and server forming the information sharing system will be described with reference to FIG. 7. FIG. 7 is a functional block diagram illustrating each terminal and server forming the information sharing system.

<<Functional Configuration of a Personal Terminal>>

First, the functional configuration of the personal terminal 2a will be described. As illustrated in FIG. 7, the personal terminal 2a includes a transmitting/receiving unit 21a, an accepting unit 22a, an image processing unit 23a, a display control unit 24a, a determining unit 25a, a storage/read processing unit 29a, and a communication managing unit 30a. Each of these units is a function or means for functioning implemented by operating one of the elements illustrated in FIG. 3 according to commands from the CPU 501 according to a program loaded from the HD 504 to the RAM 503. The personal terminal 2a includes a storage unit 2000a formed by the RAM 503 and the HD 504 illustrated in FIG. 3.

Note that the transmitting/receiving unit 21a, the accepting unit 22a, the image processing unit 23a, the display control unit 24a, the determining unit 25a, and the storage/read processing unit 29a are implemented by a web browser (a web application thereof) for displaying the personal board screen to be described later. The communication managing unit 30a is implemented by an exclusive-use communication application.

(Functional Configuration)

Next, the functional configuration of the personal terminal 2a will be described in detail. The transmitting/receiving unit 21a transmits and receives various kinds of data (or information) with other terminals, devices, or servers via the communication network 9. For example, the transmitting/receiving unit 21a receives content data described in Hyper Text Markup Language (HTML), Cascade Style Sheet (CSS), and JavaScript (registered trademark), from the content management server 6. The transmitting/receiving unit 21a transmits the operation information input by the user to the content management server 6.

The accepting unit 22a accepts various kinds of input information from the keyboard 511 and the pointing device 512 input by a user. The image processing unit 23a performs, for example, a process such as creating vector data (or stroke data) according to rendering by the user. Further, the image processing unit 23a has a function as an incorporating unit. For example, the image processing unit 23a captures an image of the shared screen ss to incorporate the captured image.

The display control unit 24a displays a personal board screen and a shared board screen as described below, on the display 506. The determining unit 25a makes various determinations. The storage/read processing unit 29a is executed by a command from the CPU 501 and by the HDD controller 505, the medium I/F 516, and the DVD-RW drive 514, and performs processes for storing various kinds of data in the storage unit 2000a, the DVD-RW 513, and the recording medium 515, and for reading various kinds of data from the storage unit 2000a, the DVD-RW 513, and the recording medium 515.

The communication managing unit 30a is implemented mainly by a command from the CPU 501 illustrated in FIG. 3, and performs data input/output with the transmitting/receiving unit 21a and the like. The communication managing unit 30a further includes a transmitting/receiving unit 31a, an incorporating unit 33a, and a determining unit 35a.

Among these, the transmitting/receiving unit 31a transmits and receives various kinds of data (or information) with the content management server 6 via the communication network 9, independently of the transmitting/receiving unit 21a. The incorporating unit 33a basically has the same function as an incorporating unit of the image processing unit 23a. For example, the incorporating unit 33a captures the screen of the shared screen ss to be described later to incorporate the captured image. The determining unit 35a makes various determinations and determines, for example, whether the captured image is being referred to by the user. Note that the functional configurations of the personal terminals 2b and 2c are the same as the functional configurations of the personal terminal 2a, and, therefore, descriptions thereof will be omitted.

<<Functional Configuration of a Permanent Terminal>>

Next, a functional configuration of the permanent terminal 4 will be described. As illustrated in FIG. 7, the permanent terminal 4 includes a transmitting/receiving unit 41, an accepting unit 42, an image processing unit 43, a display control unit 44, a determining unit 45, a storage/read processing unit 49, and a communication managing unit 50. Each of these units is a function or means for functioning implemented by operating one of the elements illustrated in FIG. 5, etc., by commands from the CPU 701 according to a program loaded from the recording medium 706 into the RAM 702.

Note that each unit may be a function or a means for functioning in which any of the elements illustrated in FIG. 5 is implemented by operating according to a command from the CPU of the stick PC 730 in accordance with a program expanded on the RAM of the stick PC 730. Further, the permanent terminal 4 includes a storage unit 4000 constructed by the RAM 703 illustrated in FIG. 5, etc. In the storage unit 4000 of the permanent terminal 4, a shared memo DB 4002 is constructed.

Note that the transmitting/receiving unit 41, the accepting unit 42, the image processing unit 43, the display control unit 44, the determining unit 45, the storage/read processing unit 49, the communication managing unit 50, and the storage unit 4000 in the permanent terminal 4 are the same as the transmitting/receiving unit 21a, the accepting unit 22a, the image processing unit 23a, the display control unit 24a, the determining unit 25a, the storage/read processing unit 29a, the communication managing unit 30a, and the storage unit 2000a in the personal terminal 2a, respectively, and, therefore, descriptions thereof will be omitted. Further, the communication managing unit 50 of the permanent terminal 4 includes a transmitting/receiving unit 51, an incorporating unit 53, and a determining unit 55; however, these respectively have the same functions as the transmitting/receiving unit 31a, the incorporating unit 33a, and the determining unit 35a, and, therefore, descriptions thereof will be omitted.

Note that the transmitting/receiving unit 41, the accepting unit 42, the image processing unit 43, the display control unit 44, the determining unit 45, and the storage/read processing unit 49 are implemented by a web browser (a web application thereof) for displaying a shared board screen. The communication managing unit 50 is implemented by an exclusive-use communication application.

<<Functional Configuration of a Content Management Server>>

Next, the functional configuration of the content management server 6 will be described. As illustrated in FIG. 7, the content management server 6 includes a transmitting/receiving unit 61, a schedule linking unit 62, an image processing unit 63, a creating unit 64, a determining unit 65, a web page creating unit 66, a searching unit 67, an authenticating unit 68, and a storage/read processing unit 69. Each of these units is a function or means for functioning implemented by operating one of the elements illustrated in FIG. 3 by commands from the CPU 501 according to a program loaded from the HD 504 to the RAM 503. The content management server 6 includes a storage unit 6000 formed by the RAM 503 and the HD 504 illustrated in FIG. 3.

(Functional Configuration)

Next, the functional configuration of the content management servers 6 will be described in detail. The transmitting/receiving unit 61 transmits and receives various kinds of data (or information) with other terminals, devices, or servers via the communication network 9. The schedule linking unit 62 acquires schedule information including bibliographic information of a conference in which a user participates from a schedule management server 8 coupled to the communication network 9 to transmit and receive various kinds of data (or information). The schedule management server 8 stores schedule information (conference (list) information) for each user (for each user ID).

The image processing unit 63 functions as an incorporating unit and captures the screen of the shared screen ss, which will be described later, to incorporate the captured screen. The creating unit 64 creates a unique content ID, a personal memo ID, a shared memo ID, and the like. The determining unit 65 determines whether the content ID, the personal memo ID, the shared memo ID, and the like are received by the transmitting/receiving unit 61.

The web page creating unit 66 creates data of a web page to be displayed on a web browser of the personal terminal 2 and the permanent terminal 4. The searching unit 67 accepts a search request from a personal portal screen described later displayed on the web browser of the personal terminal 2 and the permanent terminal 4, and performs searching according to the search request. Further, the authenticating unit 68 performs a process of authenticating the user. The authenticating unit 68 may be included in a device other than the content management server 6, and for example, an authentication server coupled to the communication network 9 may be used.

The storage/read processing unit 69 is executed by a command from the CPU 501, the HDD controller 505, the medium I/F 516, and the DVD-RW drive 514, and performs a process for storing various kinds of data in the storage unit 6000, the DVD-RW 513, and the recording medium 515, and performs a process for reading various kinds of data from the storage unit 6000, the DVD-RW 513 and the recording medium 515.

Further, a personal memo DB 6001, a shared memo DB 6002, an interest level management DB 6003, a personal memo management DB 6004, and a shared memo management DB 6005 are formed in the storage unit 6000 of the content management server 6.

Note that the data described above may be stored in a separate server other than the content management server 6. In this case, with respect to the timing of data acquisition and transmission, the data may be acquired from a separate server each time a request for data acquisition and transmission is made from the personal terminal 2, or the data may be stored in the content management server 6 during a conference or while the personal board and the shared board are referred to by a user, and may be deleted from the content management server 6 after the conference has ended or after the end of the referring (or after a certain period of time) and may be sent to a separate server.

Note that the group of devices described in the present embodiment is merely indicative of one of a plurality of computing environments for carrying out the embodiments described herein. In some embodiments, the content management server 6 includes a plurality of computing devices, such as server clusters. The plurality of computing devices is configured to communicate with each other via any type of communication link, including networks, shared memory, and the like, and performs the processes described herein. Similarly, the personal terminal 2 and the permanent terminal 4 may include a plurality of computing devices configured to communicate with each other.

Figure 25:
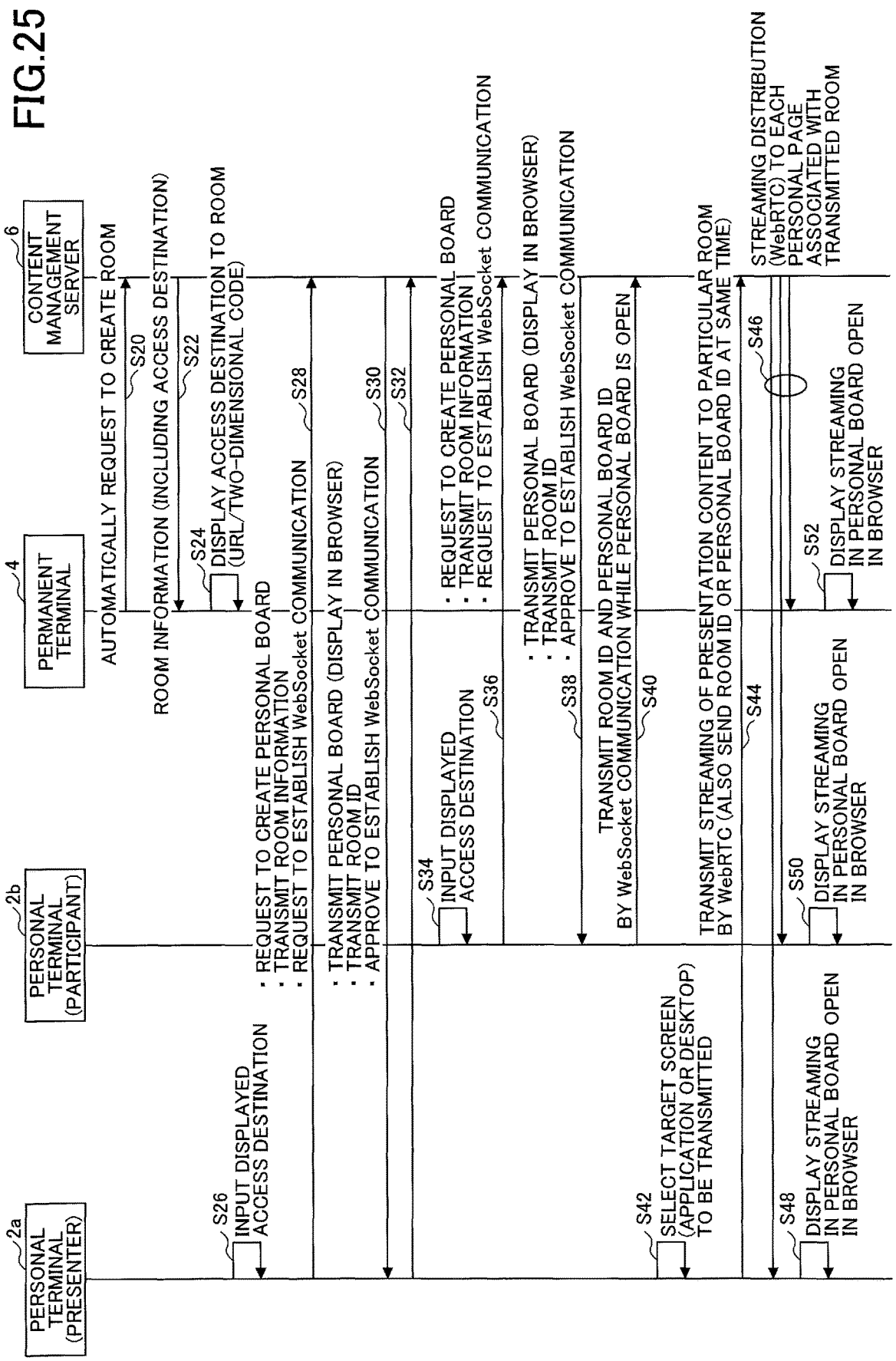
FIG. 25 is a sequence diagram illustrating the process from the preparation for a conference to the display of a projection screen on a personal board according to an embodiment of the present invention.
Figure 27:
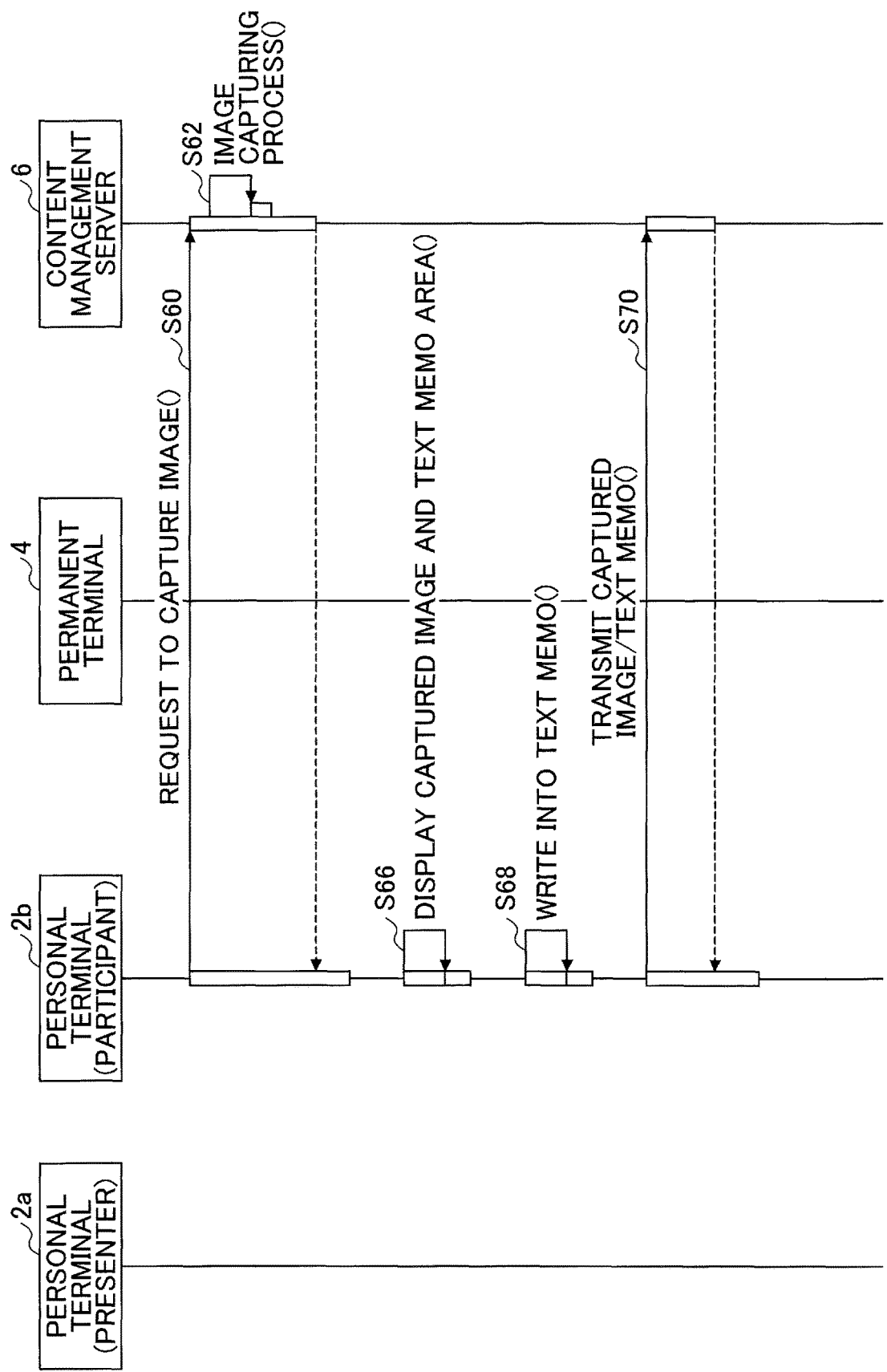
FIG. 27 is a sequence diagram illustrating an example of a process of incorporating a captured image of a projection screen and inputting a memo to the captured image and a text memo area according to an embodiment of the present invention.

Further, the content management server 6, the personal terminal 2, and the permanent terminal 4 can be configured to share the described processing steps, for example, by various combinations of elements illustrated in FIGS. 25 and 27. For example, a portion of the process executed by the content management server 6 may be executed by the personal terminal 2 and the permanent terminal 4. Further, the elements of the content management server 6, the personal terminal 2, and the permanent terminal 4 may be grouped into a single device or divided into a plurality of devices.

<Example of a Personal Board Screen>

Display examples of a personal board screen 1000 displayed until the end of a conference will be described with reference to FIGS. 8 to 12. The personal board screen 1000 is a screen for displaying information to be presented to the user or for accepting operations from the user through a Graphical User Interface (GUI), and is a display mode of a web browser or application software.

As illustrated in FIGS. 8 to 12, in the personal board screen 1000 displayed until the end of the conference, a projection area for displaying a projection screen is displayed on the left side and a memo area is displayed on the right side. In the projection area, the shared screen ss is displayed as a projection screen. In the memo area, a combination of a captured image 1022 of the projection screen and a text memo area 1024 associated with the captured image 1022 is displayed in a sheet 1020.

The user can perform an operation of pressing a capture button 1016 to capture the projection screen displayed in the projection area, to additionally display the sheet 1020 in which the combination of the captured image 1022 and the text memo area 1024 is displayed, in the memo area. Note that the operation of pressing the capture button 1016 is an example; for example, an operation of pressing a shortcut key from the keyboard or a gesture operation from the touch panel may be performed.

Figure 8:
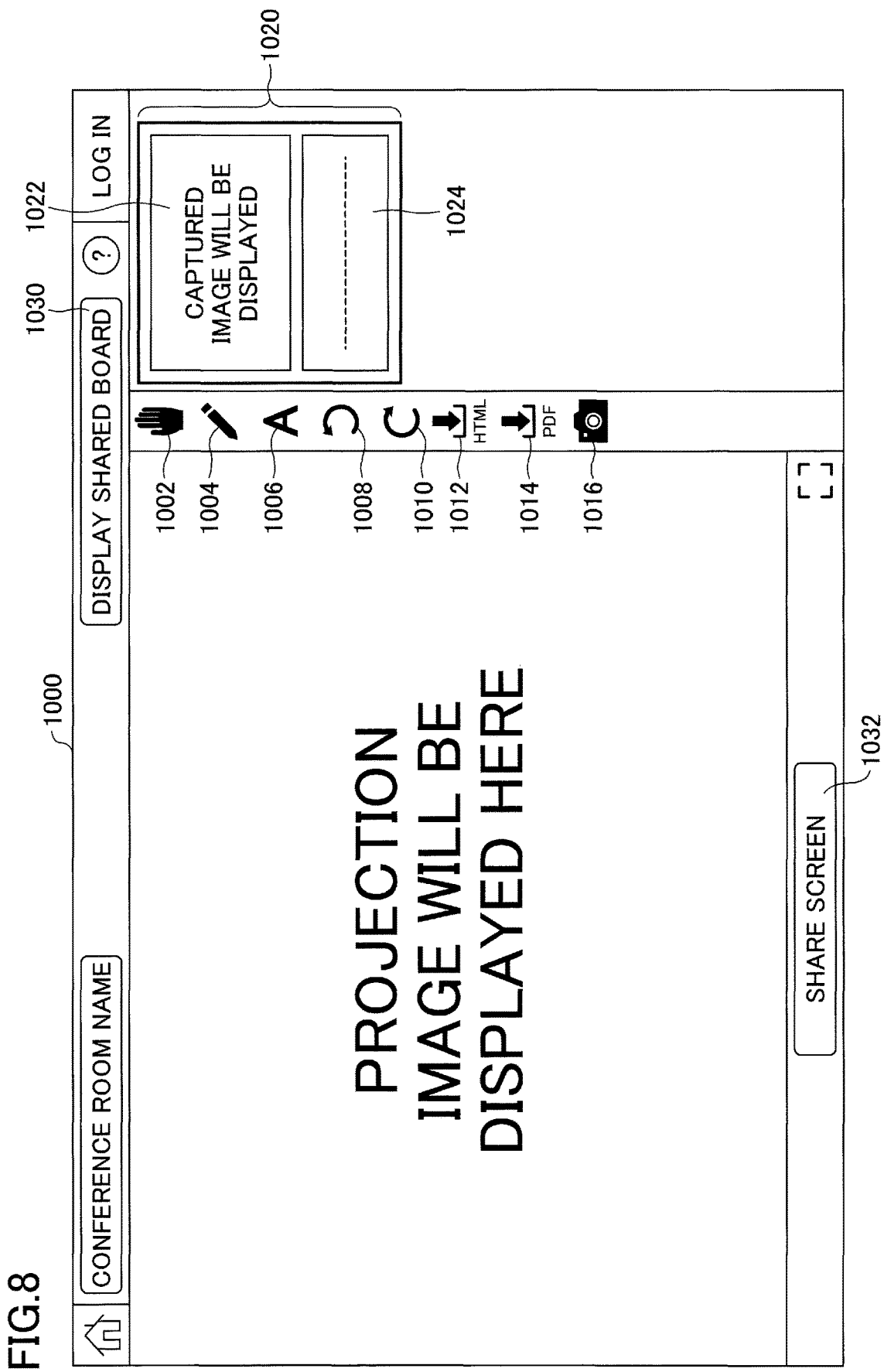
FIG. 8 is an image diagram illustrating an example of a projection screen display and a personal board screen before the first screen capture is performed according to an embodiment of the present invention.

FIG. 8 is an image diagram of an example of the personal board screen 1000 before a projection screen is displayed and before performing screen capturing of the first sheet. For example, in the personal board screen 1000 of FIG. 8, a guidance message reading "projection image will be displayed here" is displayed in the projection area. In the memo area of FIG. 8, a guidance message reading "captured image will be displayed" is displayed as the captured image 1022. By displaying such a guidance message, the user can imagine the screen image after the screen capturing is performed, before the screen capturing of the first sheet is performed in the personal board screen of FIG. 8. Note that the guidance message may not be displayed. Further, even before the screen capturing of the first sheet is performed, a user input to the text memo area 1024 may be acceptable.

Figure 9:
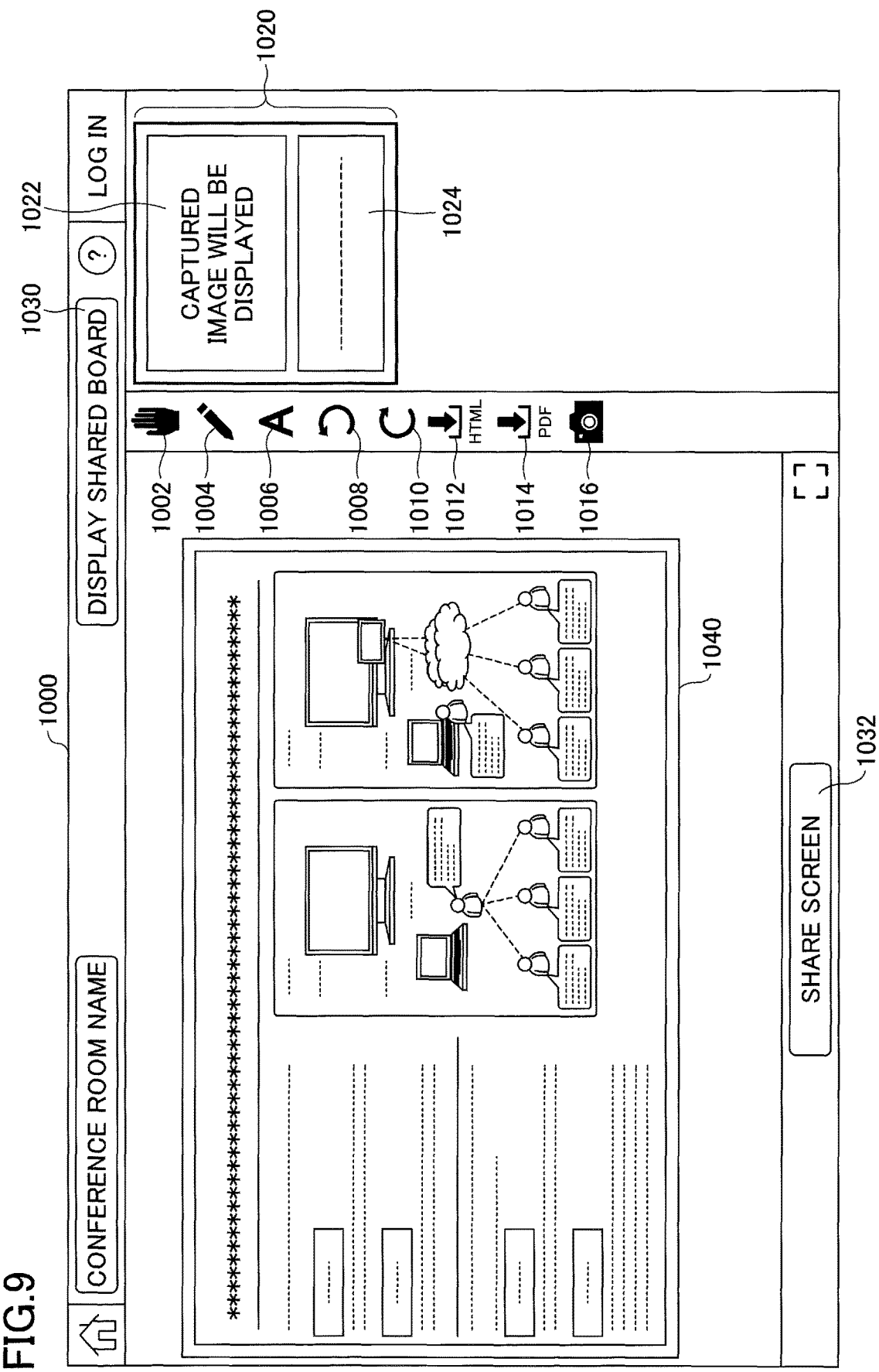
FIG. 9 is an image diagram of an example of a personal board screen on which a projection screen is displayed according to an embodiment of the present invention.

When the data of a content, such as stream data, is transmitted to the shared screen ss, the personal board screen 1000 of FIG. 8 becomes the personal board screen 1000 as illustrated in FIG. 9. FIG. 9 is an image diagram illustrating an example of the personal board screen 1000 in which a projection screen 1040 is displayed. In the projection area of FIG. 9, a screen of a content such as stream data transmitted to the shared screen ss, is displayed as the projection screen 1040.

Figure 10:
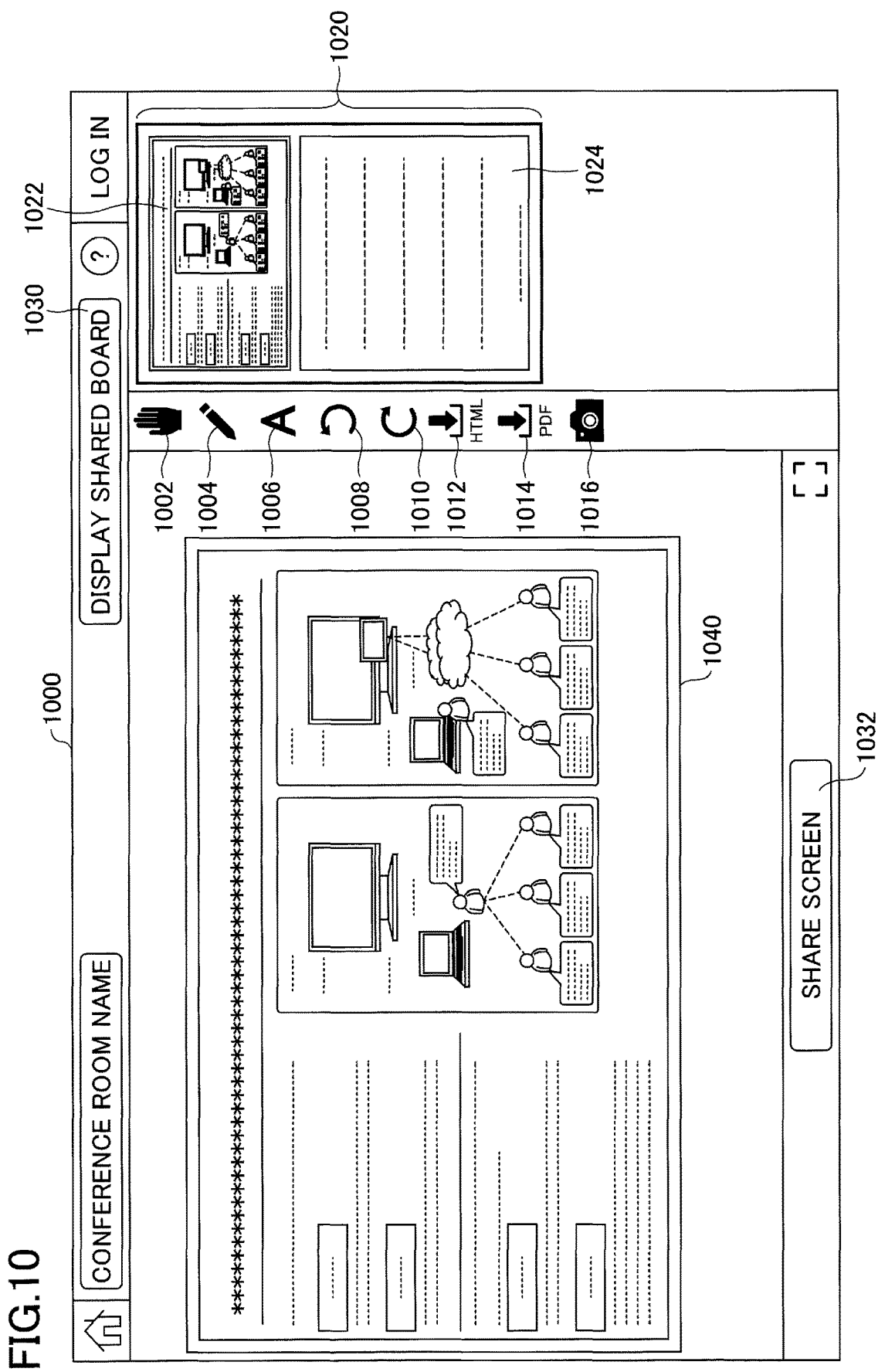
FIG. 10 is an image diagram illustrating an example of a personal board screen for which the first screen capture has been performed according to an embodiment of the present invention.

When the personal board screen 1000 of FIG. 9 accepts an operation of pressing the capture button 1016 from a user, the personal board screen 1000 of FIG. 10 is formed. FIG. 10 is an image diagram illustrating an example of the personal board screen 1000 when the screen capturing of a first sheet has been performed. For example, the personal board screen 1000 illustrated in FIG. 10 is an example of a user interface (UI) in which the shared screen ss and the personal board dc are displayed in a single screen. Note that the personal board screen 1000 may be a UI that switches the display between the shared screen ss and the personal board dc by switching tabs.

By performing an operation of pressing the capture button 1016 by the user, it is possible to capture an image of the projection screen 1040 at that time, and display the captured image 1022 of the projection screen 1040 in the memo area. Further, the user may display the text memo area 1024 associated with the captured image 1022 in the memo area. The captured image 1022 and the text memo area 1024 associated with the captured image 1022 are displayed, for example, on the single sheet 1020, so that the combination of the captured image 1022 and the text memo area 1024 is displayed to be easily recognizable as a combination. Note that when the operation of pressing the capture button 1016 is accepted from the user, the projection screen 1040 at that time may be compared with the captured image 1022 of the projection screen 1040 that has already been captured and displayed in the memo area, so that an image of the same content is not captured.

Further, the mouse cursor is aligned with the first line in the text memo area 1024 that is newly displayed by an operation of pressing the capture button 1016 by the user. Accordingly, the user can easily shift from the operation of pressing the capture button 1016 to operating the text memo area 1024. Note that the text memo area 1024 extends downward finitely or infinitely by input of a text memo by the user.

Further, in the captured image 1022, an object may be rendered by using a pen tool and the like. In the personal board screen 1000, a tool palette displaying a hand tool button 1002, a pen tool button 1004, a text tool button 1006, an undo button 1008, a redo button 1010, an HTML save button 1012, a Portable Document Format (PDF) save button 1014, and the capture button 1016, is displayed.

The hand tool button 1002 is a button for the user to start using a hand tool. By using the hand tool, the user can select an object rendered in the captured image 1022 and move the object by drag and drop. The pen tool button 1004 is a button for the user to start using the pen tool. By using the pen tool, the user can select a color or line thickness and render an object in the captured image 1022.

The text tool button 1006 is a button for the user to start using a text tool. By using the text tool, the user can create a text area in the captured image 1022 and input text. The undo button 1008 is a button for undoing the work performed. The redo button 1010 is a button for redoing the work undone with the undo button 1008.

The HTML save button 1012 is a button for locally storing information of the personal board screen 1000 in an HTML file. The PDF save button 1014 is a button for locally storing the captured image 1022 and the text memo area 1024 displayed in the memo area of the personal board screen 1000, in a PDF file. The capture button 1016 is a button for capturing the projection screen 1040 displayed in the projection area and additionally displaying the sheet 1020 in which a combination of the captured image 1022 and the text memo area 1024 is displayed, in the memo area.

Note that it may be possible to delete an object rendered in the captured image 1022 by using a Delete key or a Back Space key. Further, the sheet 1020 may be deleted by using the Delete key or the Back Space key.

While performing editing, such as rendering an object into the captured image 1022 and inputting a text memo into the text memo area 1024, the projection area may be reduced so that the memo area can be enlarged, to facilitate editing operations. The projection area may be reduced and the memo area may be enlarged automatically by a web application, or by an operation by a user of moving the tool palette to the left.

Figure 18:
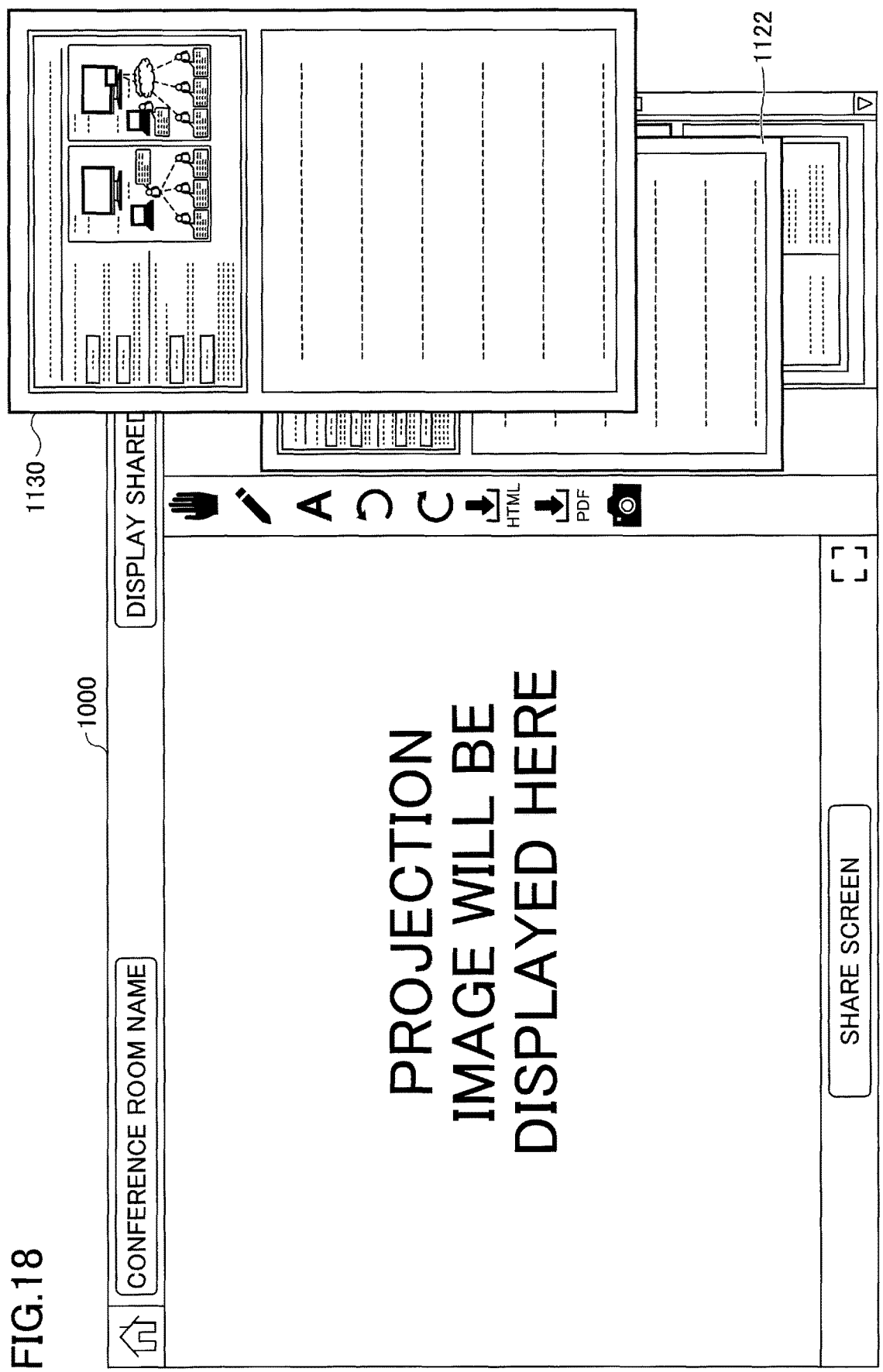
FIG. 18 is an image diagram illustrating an example of a personal board screen that accepts the editing of a sheet from a user during a conference according to an embodiment of the present invention.

Further, as illustrated in FIG. 18, in the personal board screen 1000 during a conference, the user may display the sheet 1020 selected from the memo area, and display the sheet as an enlarged sheet 1122 or display the sheet in a separate window 1130. FIG. 18 is an image diagram of an example of the personal board screen 1000 for accepting an editing operation with respect to the sheet from a user during a conference.

Further, for example, the sheet 1020 during editing of the captured image 1022 or the text memo area 1024 may be enclosed by a frame border or the color of the sheet 1020 may be changed, so as to facilitate visual recognition of the sheet 1020.

Figure 11:
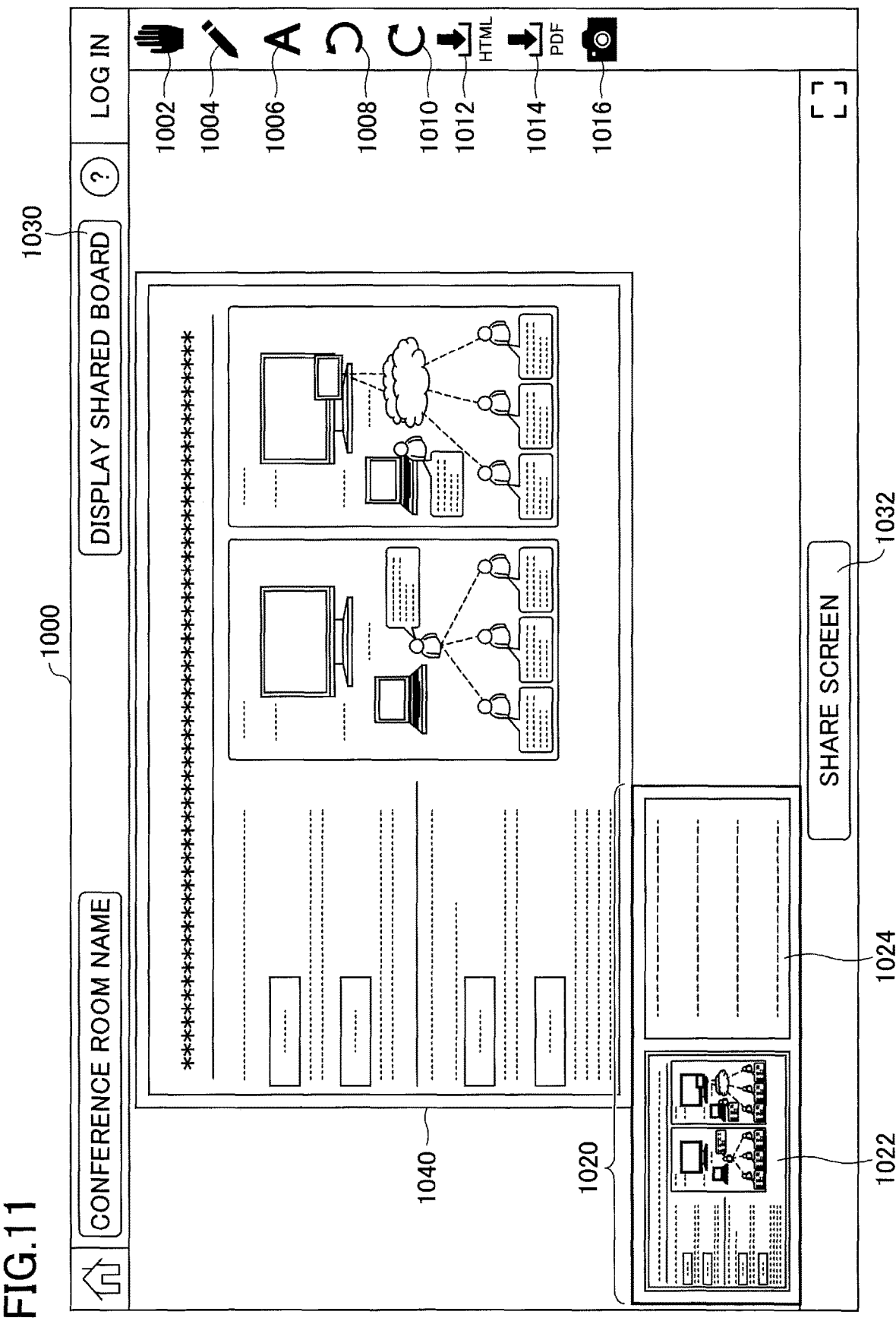
FIG. 11 is an image diagram illustrating an example of a personal board screen in which the memo area is displayed on the lower side according to an embodiment of the present invention.

Note that the memo area is not limited to being displayed on the right side of the personal board screen 1000, but may be displayed on the left side, or may be displayed on the lower side as illustrated in FIG. 11. FIG. 11 is an image diagram of an example of the personal board screen 1000 in which the memo area is displayed on the lower side. By performing an operation of pressing the capture button 1016, the user can capture an image of the projection screen 1040 displayed in the projection area, and additionally display the sheet 1020 in which the combination of the captured image 1022 and the text memo area 1024 is displayed, in the memo area.

Figure 12:
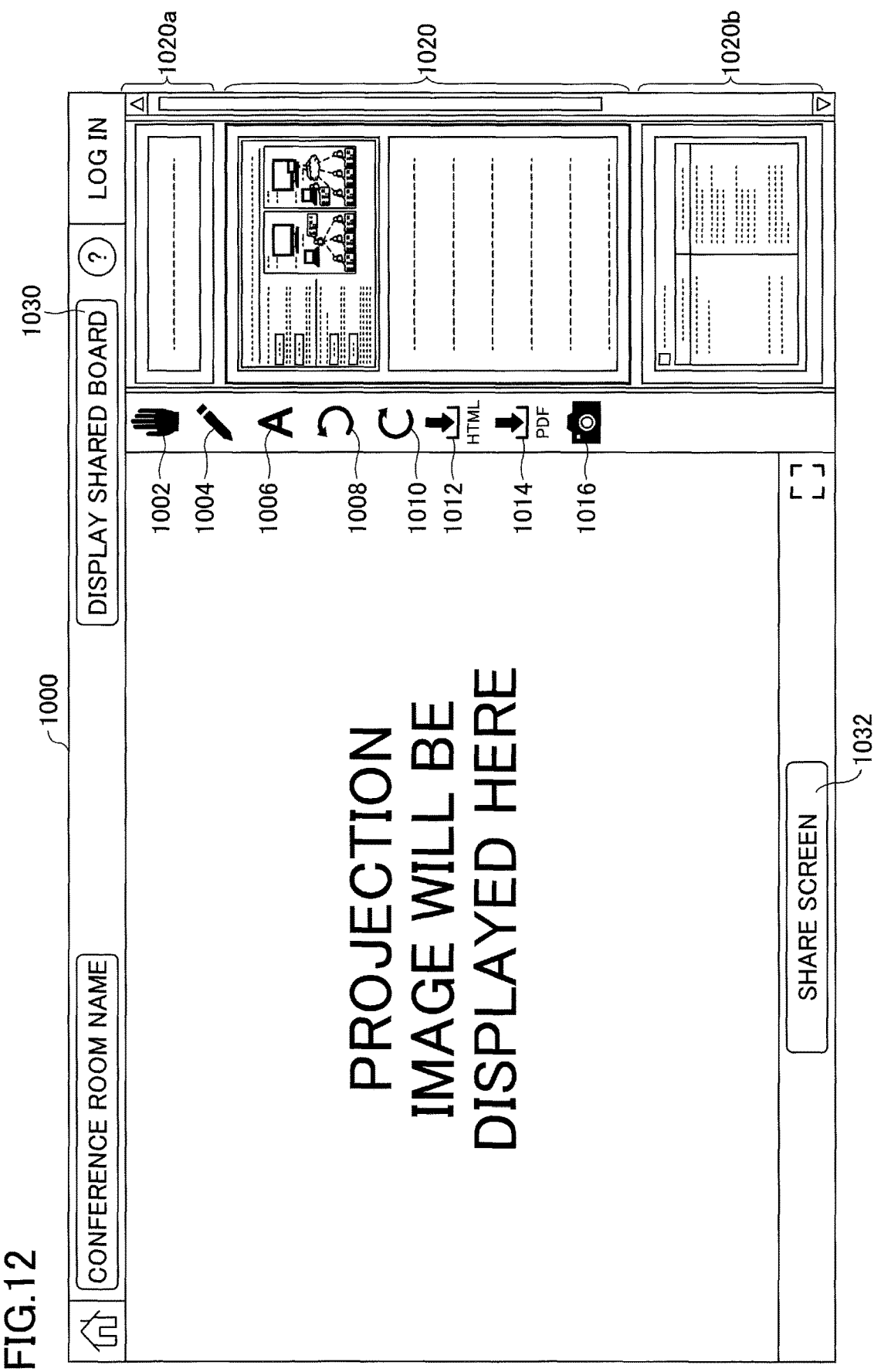
FIG. 12 is an image diagram illustrating an example of a personal board screen in which three or more screens are captured according to an embodiment of the present invention.

Further, the personal board screen 1000, which has accepted the operation of pressing the capture button 1016 three times or more from the user, displays a plurality of sheets 1020*a*, 1020, and 1020*b* in the memo area, for example, as illustrated in FIG. 12. FIG. 12 is an image diagram of an example of the personal board screen 1000 in which three or more sheets of screens are captured.

In the personal board screen 1000 of FIG. 12, each time a user presses the capture button 1016, one of the plurality of sheets 1020*a*, 1020, and 1020*b* is additionally displayed, so as to be aligned vertically in the memo area. In the case of the personal board screen 1000 of FIG. 11, each time the user presses the capture button 1016, one of the plurality of sheets 1020*a*, 1020, and 1020*b* is additionally displayed so as to be aligned in the left to right direction of the memo area.

Next, a display example of a personal board screen 1100 after the conference has ended will be described with reference to FIGS. 13 to 18. The personal board screen 1100 is a screen for displaying information to be presented to the user or accepting operations from the user through a GUI, and is a display mode of a web browser or application software.

Figure 13:
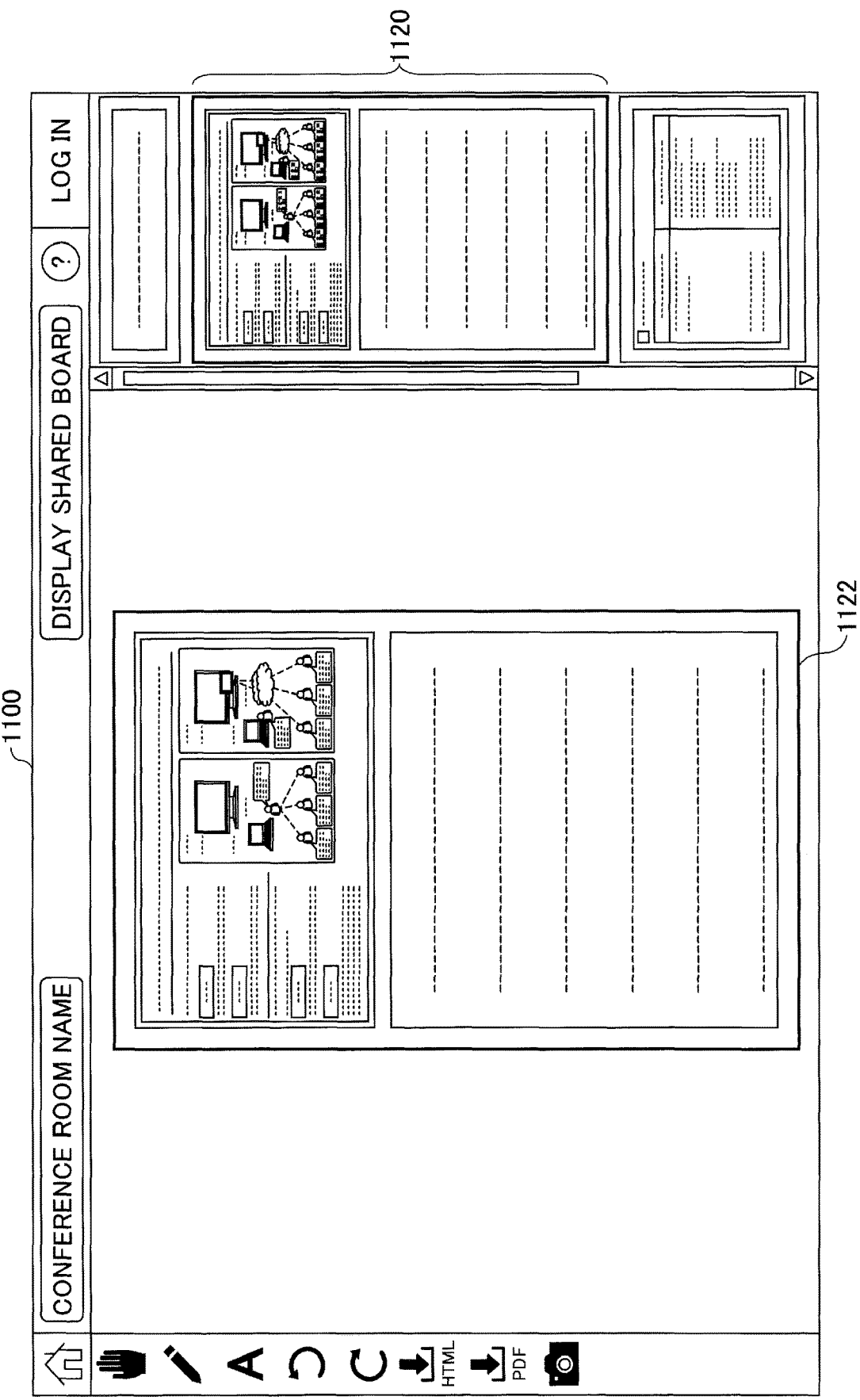
FIG. 13 is an image diagram illustrating an example of a personal board screen after a conference has ended according to an embodiment of the present invention.

FIG. 13 is an image diagram of an example of the personal board screen 1100 after a conference has ended. In the personal board screen 1100 after a conference has ended illustrated in FIG. 13, a memo area similar to that of the personal board screen 1000 is displayed on the right side, and an enlarged sheet area is displayed on the left side. In the enlarged sheet area, the enlarged sheet 1122 of the sheet 1120 selected by the user from the memo area is displayed. Similar to the case of during a conference, the enlarged sheet 1122 allows editing by the user such as rendering objects into the captured image 1022 and inputting text memos into the text memo area 1024.

In the memo area of the personal board screen 1100, a list of all of the sheets 1120 are displayed vertically. The user can scroll up and down the memo area. The user may display the sheet 1120 selected from the memo area as the enlarged sheet 1122 in the enlarged sheet area on the left side.

Note that as will be described later, the personal terminal 2 displaying the personal board screen 1100 transmits information of the sheet 1120 selected by the user from the memo area and information of the sheet 1120 displayed for a certain time or more as the enlarged sheet 1122, to the content management server 6, to cause the content management server 6 to record the information as the number of times the sheet 1120 is referred to. Further, the number of times the sheet 1120 is referred to may also be considered so that the first sheet, which is more visible due to the arrangement in the memo area, is not over-counted.

Further, the personal terminal 2 may transmit, to the content management server 6, the edited contents with respect to the sheet 1120 or the enlarged sheet 1122, for example, at a timing when a click operation is accepted at portions other than the currently selected sheet 1120 or the enlarged sheet 1122. Further, the display of the memo area such as that of FIG. 13, is one example, and instead of displaying the sheet 1120, for example, the number or a character summary of the sheet 1120 may be displayed.

Figure 14:
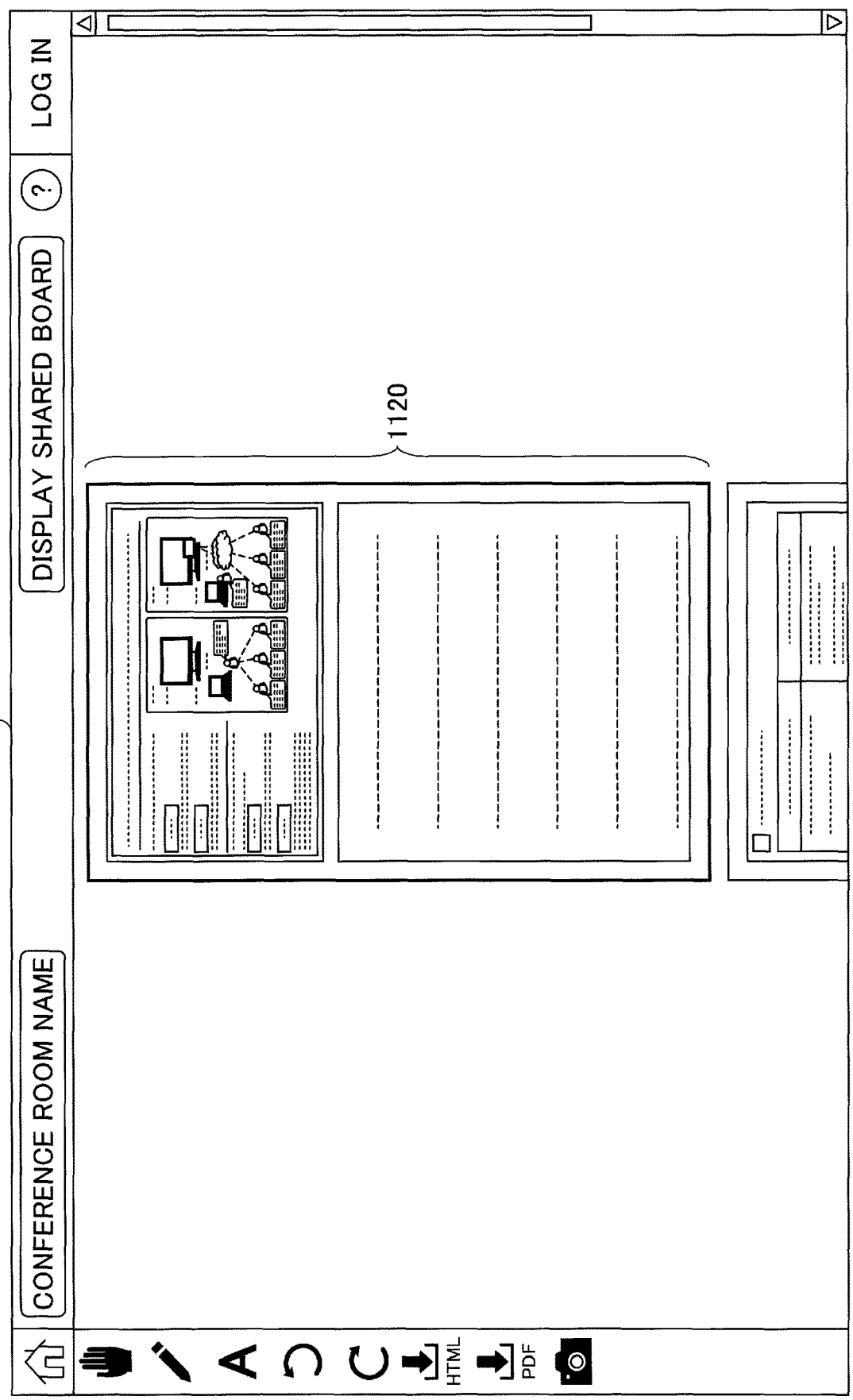
FIG. 14 is an image diagram illustrating an example of a personal board screen after a conference has ended according to an embodiment of the present invention.

FIG. 14 is an image diagram of an example of the personal board screen 1100 after the conference has ended. The personal board screen 1100 after the conference has ended illustrated in FIG. 14 is an example in which the sheets 1120 are continuously displayed in the vertical direction in the sheet area. The sheet 1120 displayed in the sheet area can be edited by the user, similar to the case of during a conference, such as rendering an object into the captured image 1022, inputting a text memo into the text memo area 1024, and the like.

Figure 15:
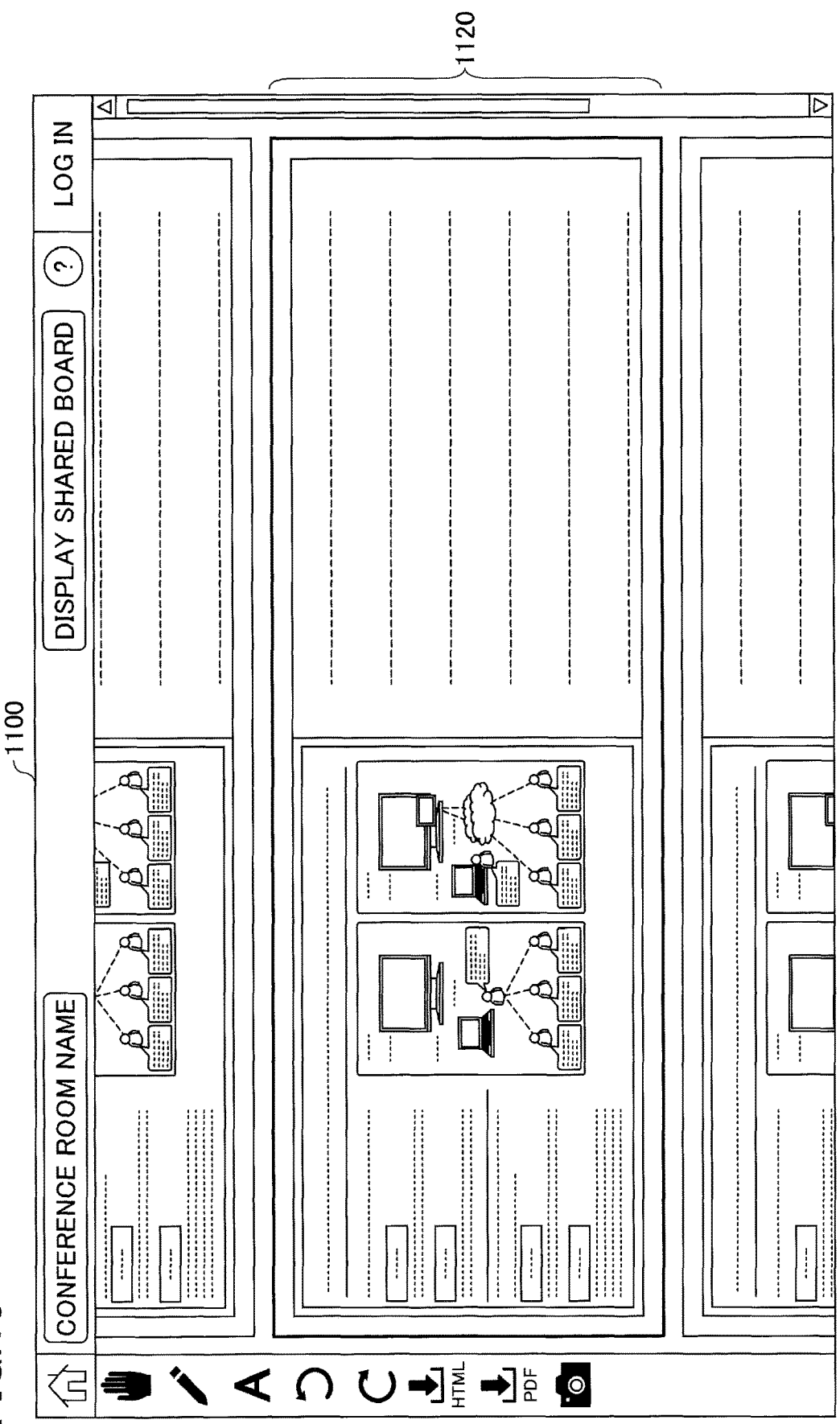
FIG. 15 is an image diagram illustrating an example of a personal board screen after a conference has ended according to an embodiment of the present invention.

FIG. 15 is an image diagram of an example of the personal board screen 1100 after the conference has ended. The personal board screen 1100 after the conference has ended illustrated in FIG. 15 is an example in which the sheets 1120, in which a text memo area is displayed next to the captured image, are continuously displayed in the vertical direction. For example, the screen of a display of, for example, a notebook PC or a desktop PC is often horizontal, and, therefore, by displaying the sheet 1120 horizontally as illustrated in FIG. 15, the sheet 1120 can be displayed in an enlarged manner. When the text memo area is large, a separate scroll bar may be displayed in each text memo area. Note that in the example of the personal board screen 1100 illustrated in FIG. 15, parts of the preceding and succeeding sheets are displayed above and below the sheet 1120.

Further, FIG. 15 illustrates an example of enlarging the sheet 1120, in which the text memo area is displayed next to the captured image, to the width of the personal board screen 1100. However, the sheet 1120 in which the text memo area is displayed below the captured image as illustrated in FIG. 14, may be enlarged to the width of the personal board screen 1100.

Figure 16:
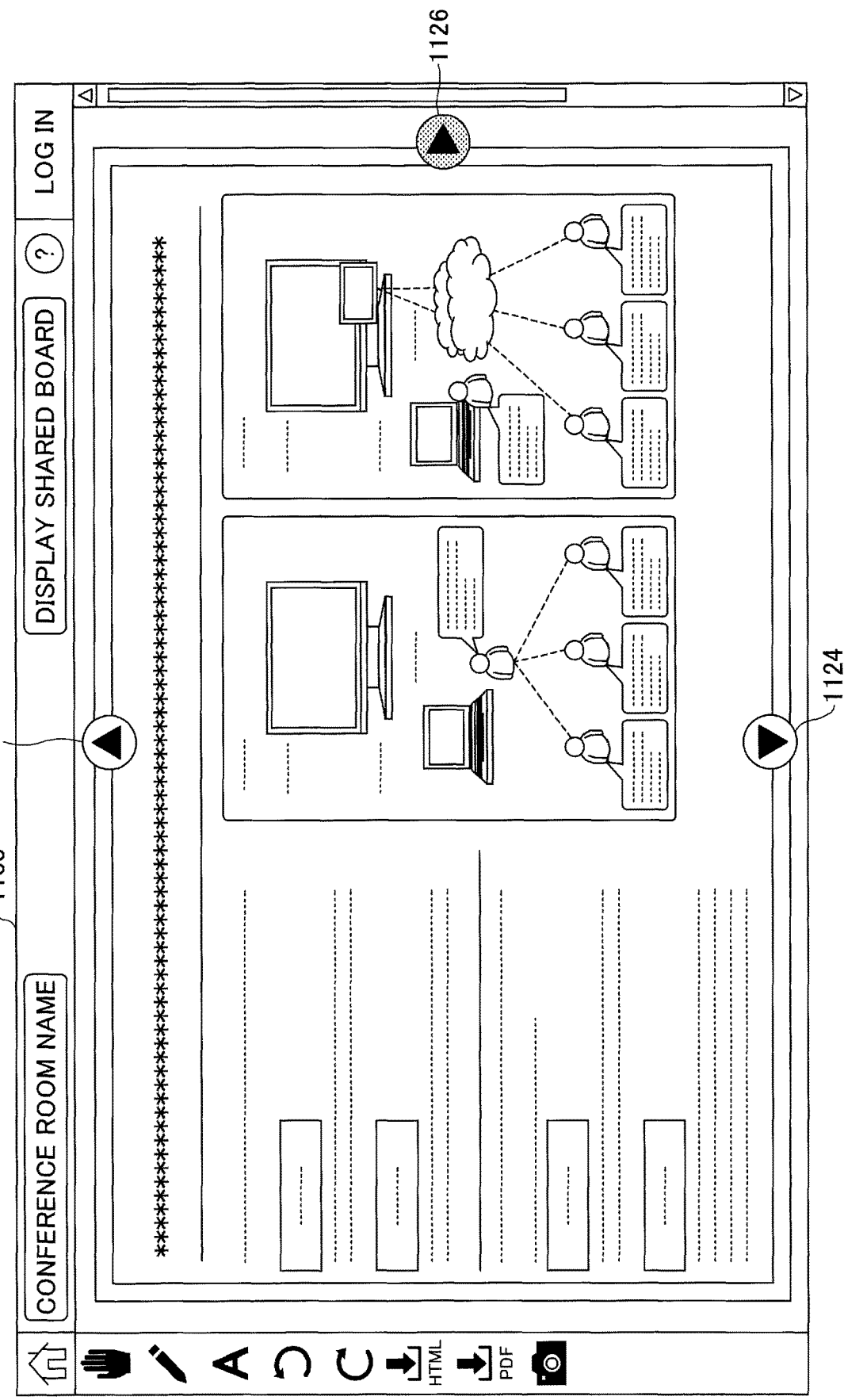
FIG. 16 is an image diagram illustrating an example of a personal board screen after a conference has ended according to an embodiment of the present invention.

FIG. 16 is an image diagram of an example of the personal board screen 1100 after the conference has ended. FIG. 16 illustrates an example in which the captured image of the sheet 1120 is enlarged to the width and the height of the personal board screen 1100 after the conference has ended. The text memo area associated with the enlarged captured image is not displayed by default, but can be displayed, for example, by pressing an icon 1126.

Note that the icon 1126 of FIG. 16 is an example, and the present embodiment is not limited to the icon 1126 as long as there is a mechanism that can report to the user that there is a hidden text memo area and that can accept, from the user, an operation of displaying/hiding the text memo area.

Further, an icon 1124 is a button that accepts, from the user, an operation of switching the captured image of the sheet 1120 displayed in the personal board screen 1100 of FIG. 16, to the captured image of the preceding or succeeding sheet 1120. The icon 1124 is displayed so that the user can recognize that there are other sheets before and after the sheet 1120 on which the captured image is displayed, in the personal board screen 1100.

For example, according to an operation of pressing the icon 1124, the personal terminal 2 displaying the personal board screen 1100 of FIG. 16 may transmit information, the time, and the like of the sheet 1120 on which the captured image is displayed, to the content management server 6, and cause the content management server 6 to record this information as the number of times of referring to the sheet 1120.

Figure 17:
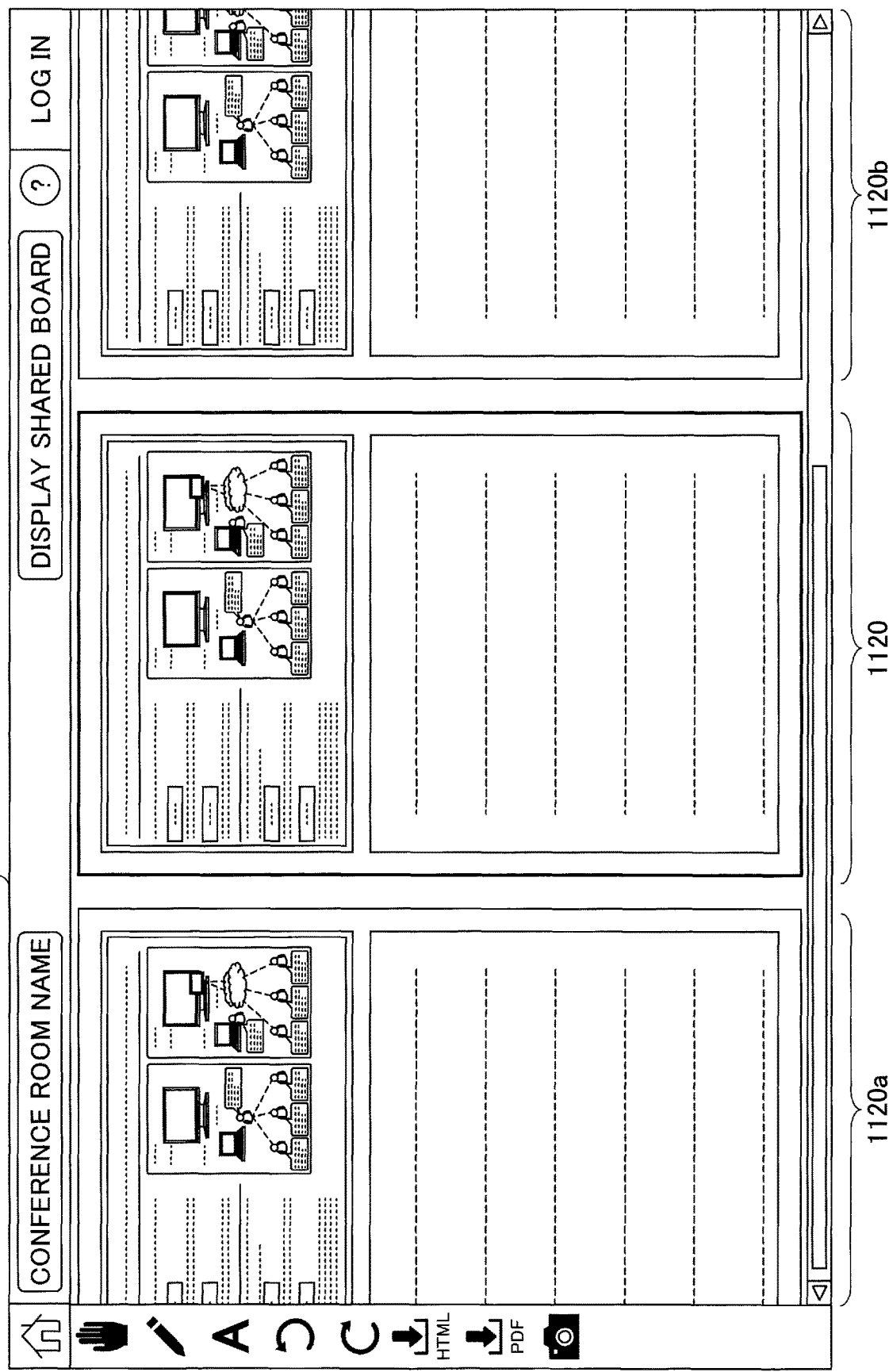
FIG. 17 is an image diagram illustrating an example of a personal board screen after a conference has ended according to an embodiment of the present invention.

FIG. 17 is an image diagram of an example of the personal board screen 1100 after the conference has ended. The personal board screen 1100 after the conference has ended illustrated in FIG. 17 is an example in which the sheets 1120*a*, 1120, and 1120*b*, in which a text memo area is displayed below the captured image, are continuously displayed in the horizontal direction. Note that in the example of the personal board screen 1100 illustrated in FIG. 17, a part of the preceding and succeeding sheets 1120*a* and 1120*b* are displayed on the left and right sides of the sheet 1120, so that the user can recognize that there is another sheet before and after the sheet 1120.

\<Db Configuration\>

\<\<Personal Memo Management DB\>\>

FIG. 19 is a configuration diagram of an example of the personal memo management DB 6004. In the storage unit 6000 of the content management server 6, the personal memo management DB 6004 as illustrated in FIG. 19 is constructed. In FIG. 19, the personal memo management DB 6004 manages a personal memo ID, a user ID, a room ID, a sheet ID, and a captured image in association with each other.

The item "personal memo ID" is an example of personal memo identification information that identifies the personal memo dm of the personal board dc. The item "user ID" is an example of user identification information that identifies the user. The item "room ID" is an example of room identification information that identifies the room. The item "sheet ID" is an example of sheet identification information that identifies the sheets 1020 and 1120. The item "captured image" is an example of image file identification information that identifies the image file obtained by capturing an image of the projection screen 1040.

When the user ID of the user who operates the personal terminal 2 is identified by the personal memo management DB 6004 illustrated in FIG. 19, it is possible to identify the room ID of the room in which the user has participated and the personal memo ID. Further, by the personal memo management DB 6004 of FIG. 19, for example, it is possible to identify the sheet 1020 displayed on the personal board screen 1000 identified from the personal memo ID and the image file of the captured image 1022 displayed on the sheet 1020.

\<\<Shared Memo Management DB\>\>

FIG. 20 is a configuration diagram of an example of the shared memo management DB 6005. In the storage unit 6000 of the content management server 6, the shared memo management DB 6005 as illustrated in FIG. 20 is constructed. In the shared memo management DB 6005 illustrated in FIG. 20, a shared memo ID, a room ID, and bibliographic information of a conference are managed in association with each other.

The item "shared memo ID" is an example of shared memo identification information that identifies the shared memo cm of the shared board cc. The item "room ID" is an example of room identification information that identifies the room. The item "bibliographic information of conference" is bibliographic information of a conference held in the room identified by the room ID. By the shared memo management DB 6005 of FIG. 20, when a room ID is identified, it is possible to identify the bibliographic information of the conference.

\<\<Personal Memo DB\>\>

FIG. 21 is a configuration diagram of an example of a personal memo DB 2001a. In the storage unit 2000a of the personal terminal 2a, the personal memo DB 2001a, as illustrated in FIG. 21, is constructed. The personal memo DB 2001a is created in the cache of the web browser, and, therefore, exists only while the web browser is running.

The data, managed in the personal memo DB 2001a is the same as the data for each personal terminal 2 managed in the personal memo DB 6001 in the content management server 6. The personal terminal 2a acquires data for the personal terminal 2a from the data of the respective personal terminals 2 managed in the content management server 6, and manages the acquired data in the personal memo DB 2001a.

In the personal memo DB 2001a of FIG. 21, a personal memo ID, a sheet ID, a content ID, content data, and the display position are managed in association with each other.

The item "personal memo ID" is an example of personal memo identification information that identifies the personal memo dm of the personal board dc. The item "sheet ID" is an example of sheet identification information that identifies the sheets 1020 and 1120. The item "content ID" is an example of content identification information that identifies each content, such as text memos and rendered objects input to the sheets 1020 and 1120.

The item "content data" is data such as text memos and rendered objects input in the sheets 1020 and 1120. For example, the content data having the content ID "c101" corresponds to the type "text memo" input to the text memo area 1024 and the like, has the font type of "times new roman", has a size of "20", and corresponds to the input text characters "ABCDE".

Further, the content data having the content ID "c103" is an example corresponding to the type "vector data" rendered in the captured image 1022, and the vector data is represented by numerical value data. Note that in the case of a text input to the captured image 1022 and the like by using a text tool, for example, by representing the content data type as "text", it is possible to distinguish between the text input to the captured image 1022 and the like and the text memo input to the text memo area 1024 and the like.

The item "display position" indicates the display position of a text memo or a rendered object input in the sheets 1020 and 1120. For example, the display position of the content input to the captured image 1022 and the like is represented by coordinates. The display position of the text memo input to the text memo area 1024 and the like is represented, for example, by the number of lines and the number of characters.

The personal memo DB 6001 has the same data structure as the personal memo DB 2001a, and, therefore, descriptions thereof will be omitted. However, the personal memo DB 6001 includes all of the data of the personal memo DBs 2001a, 2001b, and 2001c.

\<\<Shared Memo DB\>\>

FIG. 22 is a configuration diagram of an example of a shared memo DB 2002a. In the storage unit 2000a of the personal terminal 2a, the shared memo DB 2002a as illustrated in FIG. 22 is constructed. The shared memo DB 2002a is created in the cache of the web browser and exists only while the web browser is running. The shared memo DB 6002 has the same data structure as the shared memo DB 2002a, and, therefore, the description thereof will be omitted.

The data managed in the shared memo DB 2002a is the same as the data managed in the shared memo DB 6002 in the content management server 6. The personal terminal 2a acquires data managed in the shared memo DB 6002 of the content management server 6 and manages the acquired data in the shared memo DB 2002a.

In the shared memo DB 2002a, a combination of a content ID, content data, and a display position of content data is managed in association with the shared memo ID for identifying the shared memo of the shared board cc.

The item "content ID" is an example of content identification information that identifies each content. The item "content data" is data of a content such as text input to the shared board cc, images pasted to the shared board cc, vector data obtained by rendering, etc. The item "display position" indicates the display position of the content on the shared board.

\<\<Interest Level Management DB\>\>

FIG. 23 is a configuration diagram of an example of the interest level management DB 6003. In the storage unit 6000 of the content management server 6, the interest level management DB 6003 illustrated in FIG. 23 is constructed. In the interest level management DB 6003 illustrated in FIG. 23, a personal memo ID, the number of times of capturing streaming, the number of times of referring to capture, the quantity of writing, and DL by PDF, are managed in association with each other.

The item "personal memo ID" is an example of personal memo identification information that identifies the personal memo dm of the personal board dc. The item "number of times of capturing streaming" is the number of times the user captures the projection screen 1040 in the personal board screen 1000 in the room identified by the personal memo ID.

The item "number of times of referring to capture" represents the total number of times of referring to capture, the number of times of referring to each capture, and the reference time, as an example of the number of times that the user has referred to the sheet 1120 in the personal board screen 1100 of the room identified by the personal memo ID, after the conference.

The number of times of referring to each capture and the reference time are the number of times of referring to each capture and the date and time of reference, for each sheet 1120 referred to by a user in the personal board screen 1100 of the room identified by the personal memo ID. The total number of times of referring to capture is the total number of times the user has referred to each sheet 1120.

The item "quantity of writing" is the quantity of information written by a user into the sheet 1020 or 1120 in the personal board screen 1100 of the room identified by the personal memo ID. In the interest level management DB 6003 of FIG. 23, as examples of the quantity of writing, the total number of text characters in each personal memo, the number of text characters of each capture in the personal memo, the number of handwritten objects (lines, stamps, etc.), the number of handwritten objects in each capture in the personal memo, and the number of handwritten characters with respect to capture, are indicated.

The total number of text characters in each personal memo is the total number of text characters obtained by adding up the number of text characters in each text memo area 1024 in the sheet 1020 and the like. The number of text characters of each capture in personal memo is the number of text characters in each text memo area 1024 of the sheet 1020 and the like.

The number of handwritten objects (lines, stamps, etc.) is the total number of objects obtained by adding up the number of handwritten objects in each captured image 1022 in the sheet 1020 and the like. The number of handwritten objects in each capture in personal memo is the number of handwritten objects in each captured image 1022 in the sheet 1020 and the like. The number of handwritten characters with respect to capture is the total number of characters obtained by adding up the number of handwritten characters in each captured image 1022 in the sheet 1020 and the like.

The item "DL by PDF" indicates whether the captured image 1022 and the text memo area 1024 displayed in the memo area of the personal board screen 1000 have been locally saved (downloaded) as a PDF file, by the PDF save button 1014 described above.

<Processes or Operations>

Next, the processes or operations according to the present embodiment will be described. In the present embodiment, a description is given of an example of a conference held in a room in which a presenter, who is an example of a user who operates the personal terminal 2a, performs streaming transmission to the shared screen ss, and a participant, who is an example of a user who operates the personal terminal 2b, participates in the conference.

Figure 24:
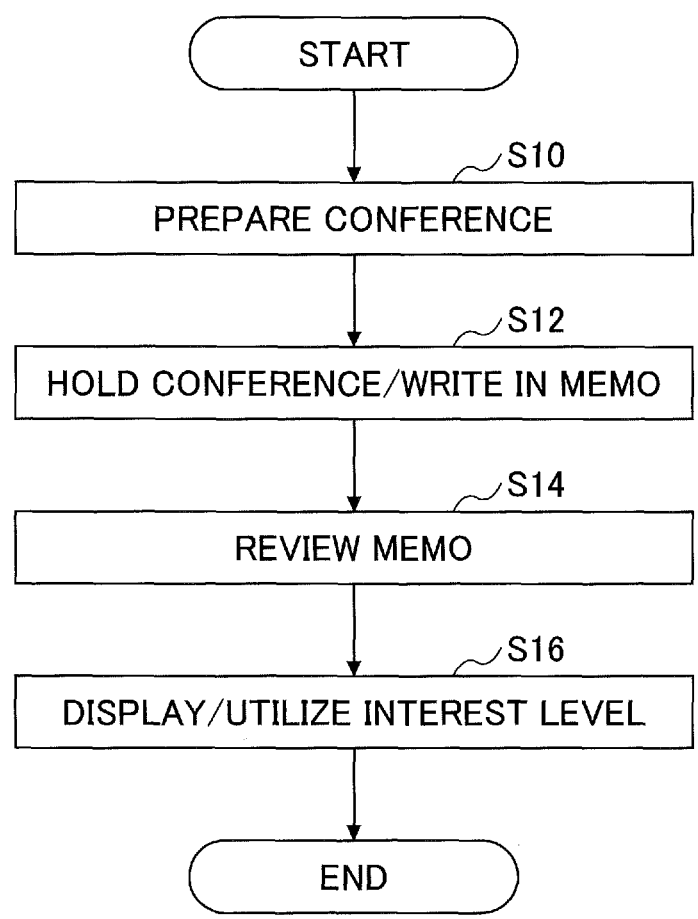
FIG. 24 is an example flowchart illustrating the process of the information sharing system according to an embodiment of the present invention.

FIG. 24 is an example of a flowchart illustrating a process of the information sharing system according to the present embodiment. In step S10, in the information sharing system, a conference is prepared. In preparing for the conference, in the information sharing system, a room is prepared by the presenter or the conference organizer based on a request from the personal terminal 2 or the permanent terminal 4, and connection is made to the room from the personal terminal 2a and the personal terminal 2b. The personal board screen 1000 as illustrated in FIG. 8 is displayed on the personal terminal 2a and the personal terminal 2b connected to the room.

In step S12, a conference is held in the information sharing system. In response to a request from the personal terminal 2 of the presenter, the information sharing system performs streaming transmission to the shared screen ss of the room, and causes each of the personal terminals 2 to display the projection screen 1040 as indicated in the personal board screen 1000 of FIG. 9. While referring to the projection screen 1040 displayed on the personal board screen 1000, the participant presses the capture button 1016 displayed on the personal board screen 1000 at a timing when he/she desires to capture an image.

The personal board screen 1000 that has accepted the operation of pressing the capture button 1016 by the participant, incorporates the captured image 1022 of the projection screen 1040 at that time. Then, the captured image 1022 and the text memo area 1024 associated with the captured image 1022 are displayed on one sheet 1020, such as the memo area of the personal board screen 1000 illustrated in FIG. 10.

In this manner, the participant can additionally display the captured image 1022 of the projection screen 1040 and the text memo area 1024 associated with the captured image 1022 in the memo area at any timing. The participant performs input to a memo, such as inputting a text memo to the text memo area 1024 displayed in the memo area as illustrated in FIG. 10, and rendering an object (inputting a handwritten memo) to the captured image 1022 displayed in the memo area. The contents of the aforementioned DBs are updated depending on the contents of the memo input.

In step S14, in the information sharing system, the personal board screen 1100 as illustrated in FIG. 13 is displayed on each personal terminal 2, so that it is possible to view (review the memo) the personal memo dm in which the participant has input a memo during the conference, and to review the memo of the conference. Note that in the personal board screen 1100 illustrated in FIG. 13, similar to the case of during a conference, it is possible to perform editing by the user such as rendering an object in the captured image 1022 and inputting a text memo to the text memo area 1024. Note that the information of reviewing the memo of the conference by the participant is transmitted to the content management server 6 for updating the interest level management DB 6003.

Furthermore, in step S16, the information sharing system displays and utilizes the participant's level of interest in the content of the conference, based on the method of taking the personal memo dm and the review of the personal memo dm by the participant.

For example, an indication of the level of interest of a participant in the content of the conference may be viewed not only by the presenter and the organizer but also by participants, by abstracting the content. Further, access to the participants' level of interest in the conference content may be restricted so that the interest level can only be viewed by the presenter and the organizer. The presenter and organizer can view the level of interest of the participant in the content of the conference, and utilize the interest level for approaching participants (sales, etc.) and feedback to the next conference, as described below.

According to steps S12 and S14, the user's operability and usability can be improved, by using a UI by which the personal memo dm can be easily taken. Further, according to step S16, by visualizing and providing the interest level of the participant in the content of the conference, it is possible to promote the utilization for approaching (sales, etc.) participants and for feedback to the next conference.

FIG. 25 is a sequence diagram of an example of a process from when preparation for a conference is started to when the projection screen 1040 is displayed on the personal board screen 1000. Steps S20 to S24 are executed at the end of the conference (at the time of exiting the room), and in step S20, the permanent terminal 4 automatically makes a room creation request to the content management server 6 at the time of exiting the previous conference. The content management server 6 creates a room and returns room information of the created room (including an access destination) to the permanent terminal 4. In step S24, the permanent terminal 4 displays the access destination to the room, included in the response from the content management server 6, in a Uniform Resource Locater (URL), a two-dimensional code, or the like. Note that the permanent terminal 4 is not an essential configuration when the participant is aware of the address for connecting to the room in advance, such as when the participant who participates in the conference is registered in advance in the content management server 6, and an address for connecting to the room has been transmitted from the content management server 6 to each personal terminal 2. When the user who participates in the conference desires to display the shared screen on a large screen in a configuration without the permanent terminal 4, the personal terminal 2 sharing the screen may output the screen to a projector, a display, an electronic white board, and the like.

In step S26, the presenter operating the personal terminal 2a inputs the access destination to the room that is being displayed in the permanent terminal 4, into the web browser. Proceeding to step S28, the personal terminal 2a accesses the access destination input to the web browser and transmits the room information, and makes a request to create a personal board and a request to establish the WebSocket communication. The WebSocket communication is a different communication method from HTTP, and is for performing interactive communication (socket communication) between a web server and a web browser. According to the WebSocket communication, while a page (in this case, a personal board) that is the target of WebSocket communication is displayed at the content management server 6 and the personal terminal 2, a Transmission Control Protocol (TCP) connection is established and the web browsers of both the content management server 6 and the personal terminal 2 continue to perform communication. Specifically, at the time of accessing the personal board, communication is performed by HTTP including the handshake, and after opening the personal board, the communication is switched to WebSocket communication to perform two-way communication, and when the personal board is closed, the WebSocket communication of the page is ended.

Proceeding to step S30, the content management server 6 transmits the personal board screen data and the room ID to the personal terminal 2a to approve of the establishment of WebSocket communication. Proceeding to step S32, the personal terminal 2a responds to the approval of the establishment of WebSocket communication in step S30. In steps S28 to S30, a handshake is performed between the personal terminal 2a and the content management server 6 by the HTTP protocol, and while the personal board screen 1000 is displayed, bi-directional communication can be performed by WebSocket communication.

In step S34, the participant operating the personal terminal 2b inputs the access destination to the room displayed in the permanent terminal 4, into the web browser. Proceeding to step S36, the personal terminal 2b accesses the access destination input to the web browser and transmits the room information, thereby making a request to create a personal board and a request to establish WebSocket communication.

Proceeding to step S38, the content management server 6 transmits the personal board screen data and the room ID to the personal terminal 2b and approves of the establishment of the WebSocket communication. Proceeding to step S40, the personal terminal 2b responds to the approval of the establishment of WebSocket communication in step S38. In steps S36 to S38, a handshake is performed between the personal terminal 2b and the content management server 6 by the HTTP protocol, and while the personal board screen 1000 is displayed, bi-directional communication can be performed by WebSocket communication.

Figure 26:
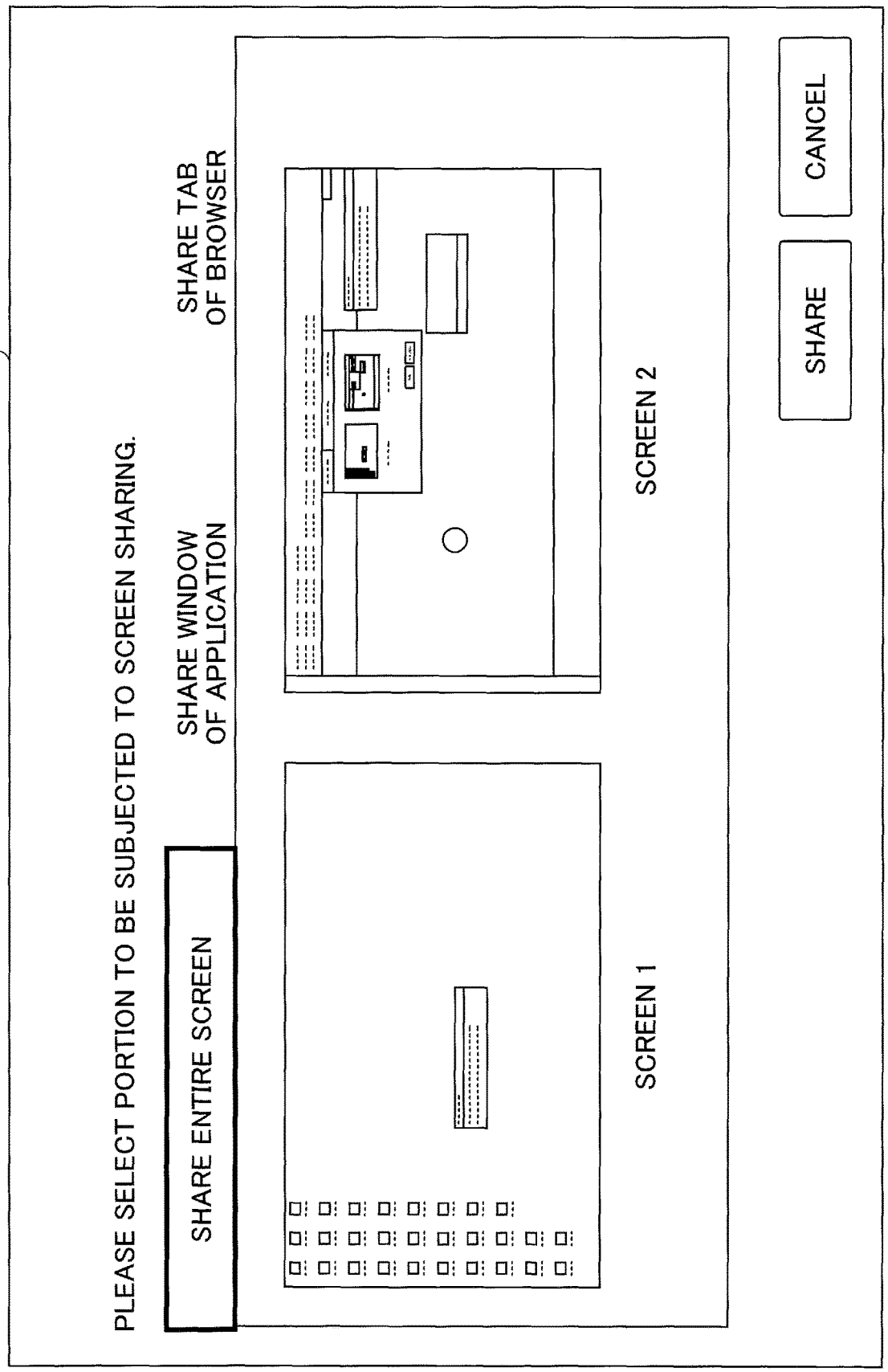
FIG. 26 is an image diagram illustrating an example of a screen for selecting a target screen to be transmitted to a shared screen according to an embodiment of the present invention.

Proceeding to step S42, the presenter who operates the personal terminal 2a selects a target screen to be transmitted to the shared screen ss from the screen 1200 as illustrated in FIG. 26, for example. FIG. 26 is an image diagram illustrating an example of a screen in which a target screen to be transmitted to the shared screen ss is selected. The screen of FIG. 26 is an example in which the target screen to be transmitted to the shared screen ss is selected from among "share entire screen", "share window of application", and "share tab of browser".

A screen 1200 in FIG. 26 is an example in which the presenter has selected "share entire screen". The screen 1200 is an example in which "screen 1" of the entire desktop or another "screen 2" displayed by dual display, are options. Further, in the screen 1200, when "share window of application" is selected, multiple applications that are activated (including an application that displays a conference/presentation material file) are displayed as options. Further, in the screen 1200, when "share tab of browser" is selected, the tabs of web browsers that are activated are displayed as options.

Proceeding to step S44, the personal terminal 2a specifies the room ID or the personal board ID and transmits the streaming of the target screen to be transmitted to the shared screen ss of a specific room, by webRTC. Note that webRTC is a standard that implements high-speed data communication via a web browser, and is one of the Application Programming Interfaces (APIs) of HTML. The webRTC is capable of transmitting and receiving data having a large volume such as video and audio data, in real time.

Proceeding to step S46, the content management server 6 performs streaming distribution by webRTC, to the personal board screen 1000 of the personal terminal 2a, the personal terminal 2b, and of the permanent terminal 4, which are associated with the room ID specified in step S44.

In step S48, the personal terminal 2a can display the projection screen 1040 received by streaming distribution, for example, as illustrated in FIG. 9, in the projection area of the personal board screen 1000 displayed by the web browser. Further, in step S50, the personal terminal 2b can display the projection screen 1040 received by streaming distribution, for example, as illustrated in FIG. 9, in the projection area of the personal board screen 1000 displayed by the web browser. Further, in step S52, the permanent terminal 4 can display the projection screen 1040 received by streaming distribution, for example, as illustrated in FIG. 9, in the projection area of the personal board screen 1000 displayed by the web browser.

For example, a participant operating the personal terminal 2*b* can incorporate the captured image 1022 of the projection screen 1040 and input a memo to the captured image 1022 and the text memo area 1024, by the procedures illustrated in the sequence diagram of FIG. 27.

FIG. 27 is a sequence diagram illustrating an example of a process of incorporating the captured image 1022 of the projection screen 1040 and inputting a memo to the captured image 1022 and the text memo area 1024.

In step S60, the participant operating the personal terminal 2*b* performs an operation of pressing the capture button 1016. The personal terminal 2*b* makes a request to capture an image to the content management server 6. In step S62, the content management server 6 captures an image of the projection screen 1040 at that time, and returns the image file of the captured image 1022 to the personal terminal 2*b*.

In the sequence diagram of FIG. 27, the capturing of the projection screen 1040 is performed by the content management server 6, but the capturing of the projection screen 1040 may be performed by the personal terminal 2*b* or the permanent terminal 4. For example, in the case of capturing the projection screen 1040 by the permanent terminal 4, the content management server 6 that has accepted the capturing request from the personal terminal 2*b* makes a request to capture an image to the permanent terminal 4.

The permanent terminal 4 captures an image of the projection screen 1040, and returns an image file of the captured image 1022 to the content management server 6. The content management server 6 transmits the returned image file of the captured image 1022 to the personal terminal 2*b*. As described above, in the case of capturing an image of the projection screen 1040 by the permanent terminal 4, for example, it is possible to capture the projection screen 1040 that can be viewed at the permanent terminal 4 by the presenter and the participant at the same time.

The personal terminal 2*b* that has received the image file of the captured image 1022 from the content management server 6 proceeds to step S66, and additionally displays the captured image 1022 of the projection screen 1040 in the memo area, for example, as illustrated in FIG. 10, by using the received image file. Further, the personal terminal 2*b* displays the text memo area 1024 associated with the captured image 1022 on the same sheet 1020 as the additionally displayed captured image 1022, for example, as illustrated in FIG. 10.

Proceeding to step S68, the participant operating the personal terminal 2*b* renders an object into the captured image 1022 and inputs a text memo into the text memo area 1024, in the additionally displayed sheet 1020.

In the sequence of FIG. 27, only the image file of the captured image 1022 is transmitted from the content management server 6 to the personal terminal 2*b*. In this case, JavaScript, which is included in the data of the web page and which operates in the browser of the personal terminal 2*b*, may create a text memo area.

Further, the content management server 6 may transmit the data of the sheet 1020 including the image of the captured image 1022 and the text memo area 1024. Further, the display positions of the image of the captured image 1022 and the sheet 1020 at this time may be determined by a program such as a script executed by the browser of the personal terminal 2*b*, or the content management server 6 may specify the display positions and transmit the display positions to the personal terminal 2*b*.

Further, the server side may generate the sheet 1020 in which the acquired image and the text memo area are combined. Note that the area other than the captured image and the text memo area (the area represented in black in the drawings) of the sheet 1020, can be an area in which handwriting can be input or an area in which handwriting cannot be input.

When a portion other than the additionally displayed sheet 1020 (the selected sheet 1020) is clicked, the personal terminal 2*b* determines that the editing is completed temporarily and proceeds to step S70. In step S70, the personal terminal 2*b* transmits information regarding the additionally displayed sheet 1020 and the edited contents with respect to the sheet 1020, to the content management server 6. Note that in step S70, the personal terminal 2*b* may transmit information regarding all of the sheets 1020 and the edited contents with respect to all of the sheets 1020, to the content management server 6.

The content management server 6 updates the contents of various DBs according to the received information regarding the sheet 1020 and the edited contents with respect to the sheet 1020. As described above, the captured image 1022 captured in the personal board screen 1000 according to an instruction from the participant, a handwritten memo input by the participant to the captured image 1022, and a text memo input by the participant to the text memo area 1024, are associated with each other by the sheet 1020 and are stored in the content management server 6.

The review of conference memo by the participant and the presenter, and the displaying and utilization of the participants' interest level in the content of the conference, are performed as follows, for example. Note that here, an example in which a participant reviews the memo of the conference from the personal terminal 2*b*, will be described.

Figure 28:
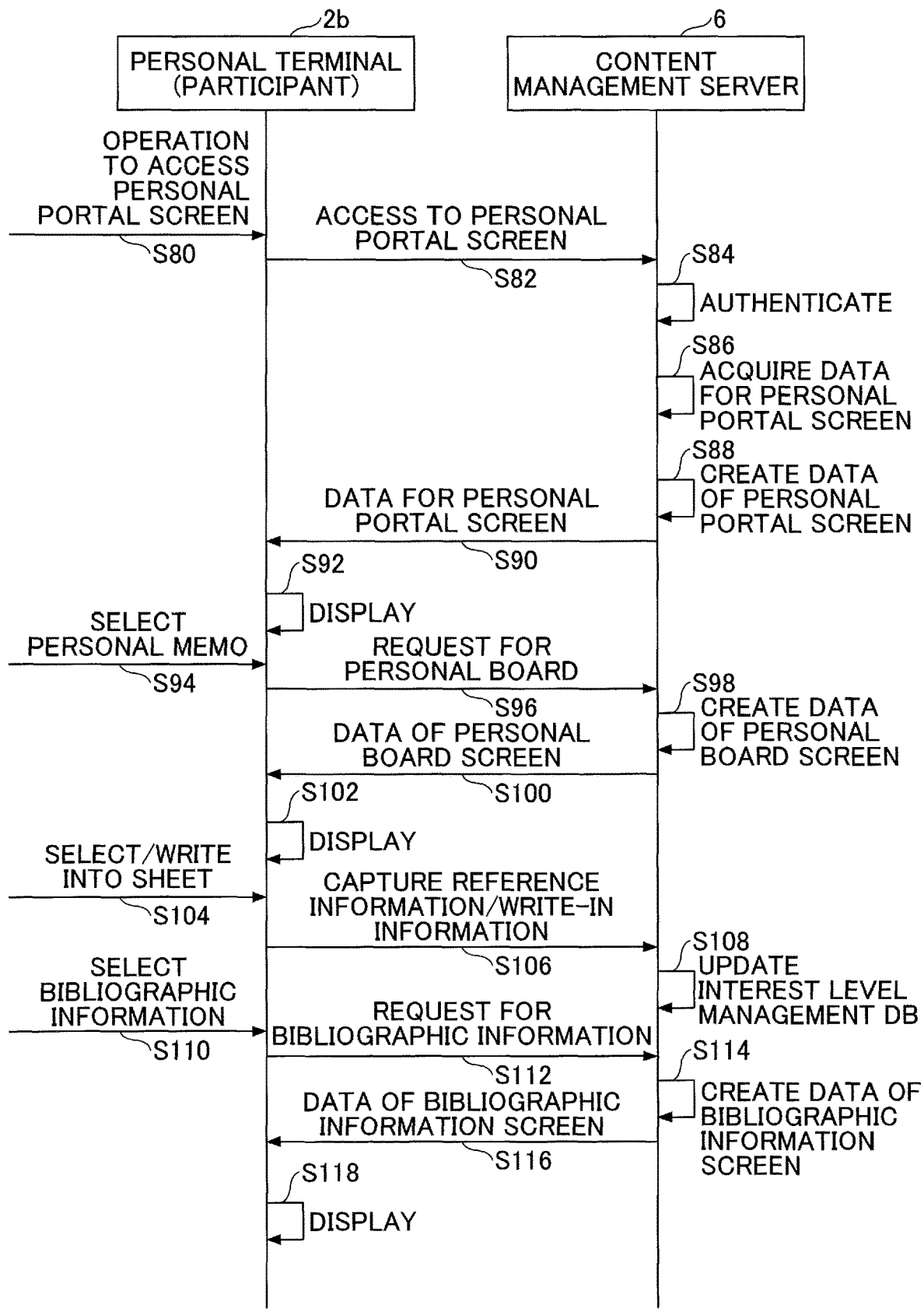
FIG. 28 is a sequence diagram illustrating a process in which a participant reviews a conference memo from a personal terminal according to an embodiment of the present invention.

FIG. 28 is a sequence diagram of an example of a process in which a participant reviews a conference memo from the personal terminal 2*b*. In step S80, the participant who operates the personal terminal 2*b* performs an operation of accessing a personal portal screen 5000 as illustrated in FIG. 29. FIG. 29 is a diagram illustrating an example of the display of the personal portal screen 5000.

The personal portal screen 5000 of FIG. 29 illustrates a conference list 5010 in which conferences in which the participant operating the personal terminal 2*b* has participated are listed. The conference list 5010 can be created by using the personal memo management DB 6004, the shared memo management DB 6005, and the interest level management DB 6003 described above.

In the example of the conference list 5010 of FIG. 29, for each conference, the date and time, the conference name, the location, a personal memo button 5030, a shared memo button 5040, self-evaluation, and a bibliographic information button 5050 are displayed as items. By the personal portal screen 5000 of FIG. 29, the participant can confirm the conference list 5010 of conferences in which the participant himself/herself has participated. Self-evaluation is an example of evaluation information.

Note that the personal memo button 5030 is linked to the personal board screen 1100 that displays the personal memo dm of the conference. The shared memo button 5040 is linked to a shared memo screen displaying the shared memo cm of the conference. The bibliographic information button 5050 is linked to a bibliographic information screen 5100 which displays the bibliographic information of the conference.

When the bibliographic information button 5050 of the personal portal screen 5000 is pressed, the personal terminal 2b displays the bibliographic information screen 5100 corresponding to the pressed bibliographic information button 5050. FIG. 30 is a diagram illustrating a display example of the bibliographic information screen 5100. The "host information" displayed at the top of the bibliographic information screen 5100 is, for example, "bibliographic information of the conference" of the shared memo management DB 6005 of FIG. 20. Further, the "capture information" displayed at the lower portion of the bibliographic information screen 5100 is created, for example, by using the interest level management DB 6003 illustrated in FIG. 23. Note that details of the "capture information" displayed at the bottom of the bibliographic information screen 5100 will be described later.

The operation for accessing the personal portal screen 5000 of step S80 may be performed by inputting the connection address for connecting to the personal portal screen 5000 to the web browser, or by selecting the personal portal screen 5000 by using a bookmark.

Proceeding to step S82, the web browser of the personal terminal 2b accesses the personal portal screen 5000. In step S84, the content management server 6 performs an authentication process with respect to the participant who operates the personal terminal 2b. Here, the description will be continued assuming that the authentication has been successful. The content management server 6 proceeds to step S86 and reads data for the personal portal screen 5000 from the storage unit 6000.

For example, the content management server 6 identifies the room ID corresponding to the conference in which the user has participated, from the personal memo management DB 6004 of the storage unit 6000 by using the user ID of the authenticated participant as the key. Further, the content management server 6 identifies the bibliographic information of the conference from the shared memo management DB 6005 of the storage unit 6000, by using the identified room ID as the key.

As described above, when the user ID of the participant can be identified, the content management server 6 can acquire the data necessary for creating the personal portal screen 5000 of FIG. 29, from various DBs in the storage unit 6000.

Proceeding to step S88, the content management server 6 creates data of the web page of the personal portal screen 5000 from the acquired data for the personal portal screen 5000. In step S90, the content management server 6 transmits the data of the web page for the personal portal screen 5000 to the personal terminal 2b.

Proceeding to step S92, the personal terminal 2b can display the personal portal screen 5000 as illustrated in FIG. 29. In the personal portal screen 5000 of FIG. 29, the conference list 5010 of conferences in which the participant who operates the personal terminal 2b participated, is displayed. In step S94, the participant who operates the personal terminal 2b presses the personal memo button 5030 of the conference for which the personal board screen 1100 is desired to be displayed.

Proceeding to step S96, the web browser of the personal terminal 2b makes a request, to the content management server 6, for the personal board screen 1100 linked to the personal memo button 5030 that has accepted the pressing operation. Proceeding to step S98, the content management server 6 creates data of the web page of the personal board screen 1100 requested from the personal terminal 2b. Proceeding to step S100, the content management server 6 transmits the data of the web page for the personal board screen 1100 to the personal terminal 2b.

Proceeding to step S102, the personal terminal 2b can display the personal board screen 1100 as illustrated in FIG. 13. Here, the description is given assuming that the participant operating the personal terminal 2b has selected the sheet 1120 of the personal board screen 1100, and has input a handwritten memo in the captured image 1022 of the selected sheet 1120 or has input a text memo (writing to the sheet 1120) in the text memo area 1024.

In step S104, the participant operating the personal terminal 2b selects the sheet 1120 of the personal board screen 1100 and writes information in the selected sheet 1120. The capture reference information regarding the sheet 1120 referred to by the participant operating the personal terminal 2b and the information written into the selected sheet 1120 by the participant operating the personal terminal 2b are transmitted from the personal terminal 2b to the content management server 6 in step S106.

With respect to the capture reference information, for example, in a case where a particular captured image is determined, by the personal terminal 2b, to be displayed on the screen of the personal terminal 2b, the capture reference information indicating that the captured image has been displayed once may be transmitted to the content management server 6, or in the case where a particular captured image is determined, by the personal terminal 2b, to be displayed for a predetermined amount of time or more, in a particular area of the personal terminal 2b, for example, in an area of a certain range from the center of the screen of the personal terminal 2b, the capture reference information indicating that the captured image has been displayed once may be transmitted to the content management server 6. Further, the capture reference information may include a display time of the captured image. The personal terminal 2b may count, as a display time, the display time of the captured image displayed on any portion of the screen of the personal terminal 2b, or may count, as a display time, only the time during which the captured image is displayed in a particular area of the screen of the personal terminal 2b, for example, the area of a certain range from the center.

Proceeding to step S108, the content management server 6 updates the interest level management DB 6003 of FIG. 23 and the like based on the capture reference information and the write information (the information of reviewing the conference memo by the participant) received from the personal terminal 2b.

Here, in step S110, the participant operating the personal terminal 2b performs an operation of pressing the bibliographic information button 5050 of the conference for which the bibliographic information screen 5100 is desired to be displayed. Proceeding to step S112, the web browser of the personal terminal 2b makes a request to the content management server 6 for the bibliographic information screen 5100 corresponding to the bibliographic information button 5050 that has accepted the pressing operation.

Proceeding to step S114, the content management server 6 creates data of the web page of the bibliographic information screen 5100 requested from the personal terminal 2b. Proceeding to step S116, the content management server 6 transmits the data of the web page for the bibliographic information screen 5100 to the personal terminal 2b. Proceeding to step S118, the personal terminal 2b can display the bibliographic information screen 5100 as illustrated in FIG. 30.

Note that the sequence diagram of FIG. 28 illustrates an example in which the user operating the personal terminal 2b displays the bibliographic information screen 5100 of FIG. 30; however, the presenter operating the personal terminal 2a may display the bibliographic information screen 5100 of FIG. 30. Further, in the bibliographic information screen 5100 of FIG. 30, the displayed contents may be changed according to the role, such as a presenter or a participant, of the user who operates the personal terminal 2.

Figure 32:
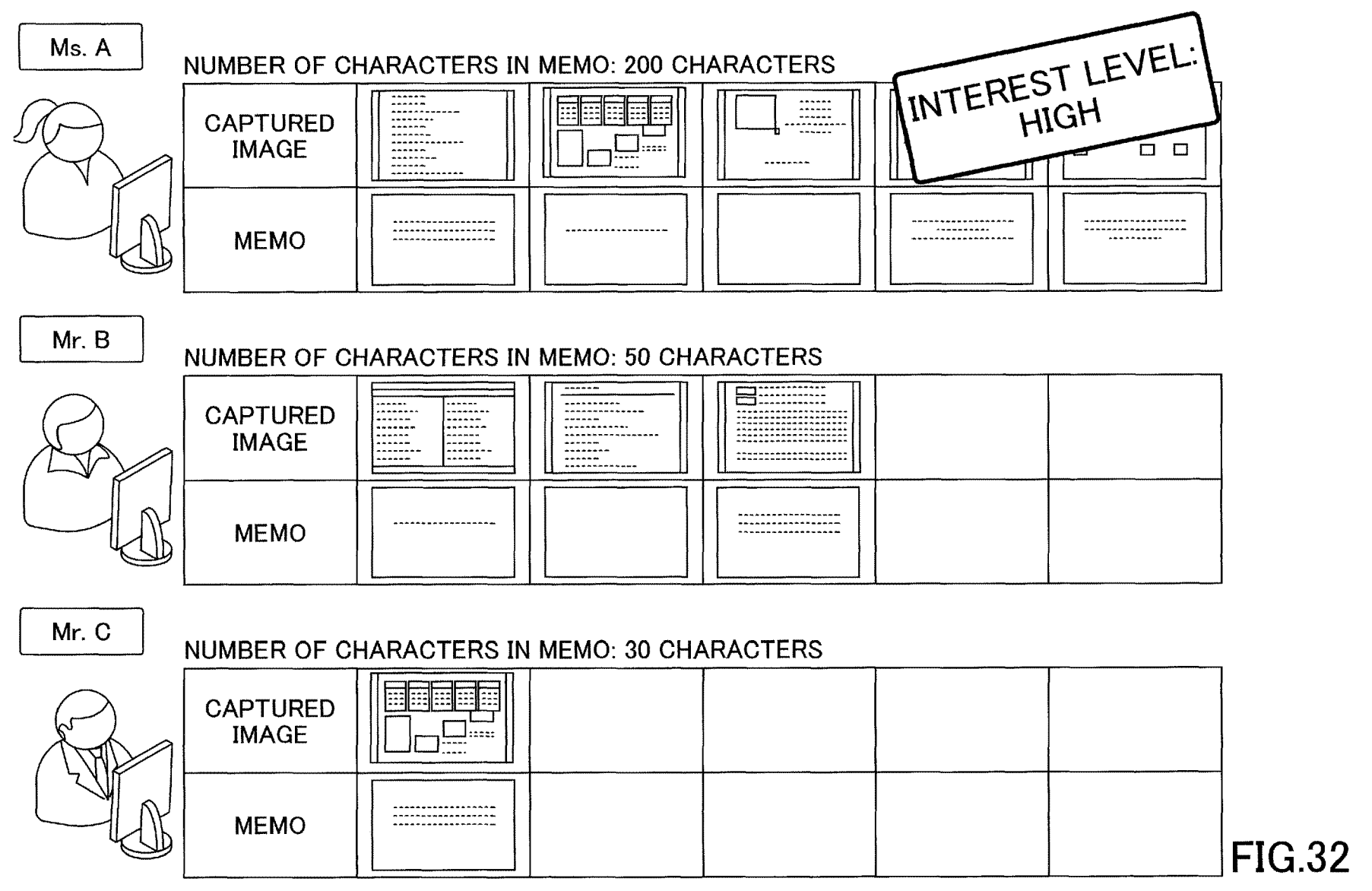

Further, the bibliographic information screen 5100 of FIG. 30 may display "capture information", for example, as illustrated in FIG. 31 or 32, or "interest level information" representing the interest level of the participant, etc., in the presentation content, by using the interest level management DB 6003 of FIG. 23, thereby displaying and utilizing the participant's interest level in the conference content.

FIG. 31 is a diagram illustrating an example of capture information of the bibliographic information screen 5100. FIG. 31 illustrates the captured image 1022 of the projection screen 1040 captured by any participant at the conference and the number of times of capturing the captured image 1022. According to the capture information illustrated in FIG. 31, the projection screen 1040 for which the interest level is high can be identified based on the captured image 1022 of the captured projection screen 1040 and the number of times of capturing the captured image 1022.

FIG. 32 is a diagram illustrating an example of capture information of the bibliographic information screen 5100. The capture information of FIG. 32 displays, for each participant, the captured image 1022 of the projection screen 1040 captured at the conference and the content of the text memo input to the text memo area 1024 associated with the captured image 1022.

In the example illustrated in FIG. 32, the number of the captured images 1022 of "Ms. A" is larger than that of other participants "Mr. B" and "Mr. C", and the number of characters "200 characters" of the text memo input into the text memo area 1024 of "Ms. A" is larger than that of other participants "Mr. B" and "Mr. C". Therefore, it can be determined that the interest level of the participant "Ms. A" in the conference content is high.

The capture information to be displayed on the personal terminal 2 of the presenter or the organizer, may display, for each participant, the captured image 1022, the text memo area 1024, and the number of written information such as the number of characters in the text memo, as in the example of FIG. 32. Further, the capture information to be displayed on the participant's personal terminal 2 may also be displayed as in the example of FIG. 32, or alternatively, only the captured image 1022, the text memo area 1024, and the number of written information such as the number of characters in the text memo of the corresponding participant, may be displayed on the participant's personal terminal 2.

Note that the role such as a presenter or a participant of the user who operates the personal terminal 2 is given in association with the bibliographic information of the conference at the time of creating the room (when creating the room based on the selection of schedule information) in step S20. The capture information displayed at the lower portion of the bibliographic information screen 5100 may include, for example, part or all of the information of the interest level management DB 6003 illustrated in FIG. 23, in which "interest level information" or "capture information" are displayed in combination or separately, by tables, graphs, diagrams, and the like.

OTHER EMBODIMENTS

While embodiments of the present invention have been described, the present invention is not limited to such embodiments, and various modifications and substitutions may be made without departing from the scope of the present invention. For example, the information sharing system according to the present embodiment may be used in the following situations.

In general seminars, a client corresponds to the participant in the present embodiment and a sales representative corresponds to the presenter or organizer in the present embodiment, and the participant's interest level can be visualized. For usage in a school, a student corresponds to the participant in the present embodiment, and a teacher corresponds to the presenter or organizer in the present embodiment, and the degree of concentration of the student in the class can be analyzed. In general conferences, employees correspond to participants in the present embodiment, and management corresponds to presenters and organizers in the present embodiment, and management is able to recognize the status of conferences in the company.

The functions of each of the embodiments described above may be implemented by one or more processing circuits. As used herein, a "processing circuit" includes a processor programmed to execute each function by software such as a processor implemented in an electronic circuit; or devices such as an Application Specific Integrated Circuit (ASIC) a digital signal processor (DSP), a field programmable gate array (FPGA), and a conventional circuit module, designed to execute each function as described above.

Note that the projection area is an example of a first area. The memo area is an example of a second area. The web page creating unit 66 is an example of a creator. The transmitting/receiving unit 61 is an example of the transmitter. The storage/read processing unit 69 is an example of the storage/read processor.

According to one embodiment of the present invention, it is possible improve a user's usability in an information processing system by which contents can be shared among a plurality of users.

The information processing apparatus, the information processing system, and the information processing method are not limited to the specific embodiments described in the detailed description, and variations and modifications may be made without departing from the spirit and scope of the present invention.

What is claimed is:

1. An information processing apparatus comprising:
processing circuitry; and
a memory storing computer-executable instructions that cause the processing circuitry to:
create data for displaying a web page in a web browser on a display device of at least one communication terminal among a plurality of communication terminals; and
transmit the created data to the at least one communication terminal, wherein
the web page includes:
a first area for displaying a shared screen to be shared among the plurality of communication terminals; and a second area including at least
an image of the shared screen displayed in response to an acquisition request, which is accepted at the at least one communication terminal, to acquire the image of the shared screen, and
an editable area, and
wherein the processing circuitry further creates the data for displaying the web page for the second area, by including, in the data, a combination of the image acquired in response to the acquisition request and a blank text area corresponding to the image for a user to input a text.

2. The information processing apparatus according to claim 1, wherein the processing circuitry further creates the data for displaying the web page to include an area into which the user can render an object, on the image displayed in the second area.

3. The information processing apparatus according to claim 1, wherein the processing circuitry further creates the data for displaying the web page in which an input position of the text is aligned with the text area in which the user can input the text.

4. The information processing apparatus according to claim 1, wherein the processing circuitry further
stores, in a storage, second data for displaying a second web page, the second data including at least one of a number of times the acquisition request to acquire the image is accepted from a user, a number of times the user refers to the image, and a quantity of information written by the user into the second area, the second data being stored in association with conference bibliographic information of a conference held by using the shared screen, and
creates, by using the second data, the data for displaying the web page including at least one of the number of times the acquisition request to acquire the image is accepted from the user, the number of times the user refers to the image, and the quantity of information written by the user into the second area, stored in the storage.

5. The information processing apparatus according to claim 4, wherein the processing circuitry further
creates the data for displaying the web page including the number of times the acquisition request is accepted from a plurality of the users operating the plurality of communication terminals, on a per-image basis with respect to the image acquired in response to the acquisition request.

6. The information processing apparatus according to claim 4, wherein the processing circuitry further
creates the data for displaying the web page including the quantity of information written by the user into the second area, on a per-image basis with respect to the image acquired in response to the acquisition request.

7. The information processing apparatus according to claim 4, wherein the processing circuitry further
creates the data for displaying the web page including the quantity of information written by a plurality of the users operating the plurality of communication terminals into the second area, on a per-image basis with respect to the image acquired in response to the acquisition request.

8. The information processing apparatus according to claim 1, wherein the processing circuitry further
creates the web page such that display information, which is displayed on a screen of another communication terminal among the plurality of communication terminals, is displayed as the shared screen in the first area, the display information being transmitted via the web browser of the another communication terminal.

9. The information processing apparatus according to claim 1, wherein the processing circuitry further
transmits at least image data corresponding to the editable area that has been updated, among the created data, to the at least one communication terminal, upon receiving the acquisition request to acquire the image.

10. An information processing method comprising:
creating data for displaying a web page in a web browser on a display device of at least one communication terminal among a plurality of communication terminals; and
transmitting the created data to the at least one communication terminal, wherein
the web page includes:
a first area for displaying a shared screen to be shared among the plurality of communication terminals; and
a second area including at least
an image of the shared screen displayed in response to an acquisition request, which is accepted at the at least one communication terminal, to acquire the image of the shared screen, and
an editable area, and
wherein the method further includes creating the data for displaying the web page for the second area, by including, in the data, a combination of the image acquired in response to the acquisition request and a blank text area corresponding to the image for a user to input a text.

11. An information processing system comprising:
a plurality of communication terminals; and
an information processing apparatus, wherein
the information processing apparatus includes:
a first processing circuitry; and
a first memory storing computer-executable instructions that cause the first processing circuitry to:
create data for displaying a web page in a web browser on a display device of at least one communication terminal among the plurality of communication terminals; and
transmit the created data to the at least one communication terminal, wherein
the at least one communication terminal includes:
a second processing circuitry; and
a second memory storing computer-executable instructions that cause the second processing circuitry to:
display the web page according to the data received from the information processing apparatus, and wherein
the web page includes:
a first area for displaying a shared screen to be shared among the plurality of communication terminals; and
a second area including at least
an image of the shared screen displayed in response to an acquisition request, which is accepted at the at least one communication terminal, to acquire the image of the shared screen, and
an editable area, and
wherein the second processing circuitry further creates the data for displaying the web page for the second area, by including, in the data, a combination of the image acquired in response to the acquisition request and a blank text area corresponding to the image for a user to input a text.

12. The information processing apparatus according to claim 1, wherein the image acquired in response to the acquisition request is a captured image that is captured from the shared screen by the user.

\* \* \* \* \*